United States Patent
Li et al.

(10) Patent No.: US 8,019,179 B2
(45) Date of Patent: Sep. 13, 2011

(54) HAND JITTER REDUCTION FOR COMPENSATING FOR LINEAR DISPLACEMENT

(75) Inventors: Jingqiang Li, San Diego, CA (US); Ying Xie Noyes, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1180 days.

(21) Appl. No.: 11/534,808

(22) Filed: Sep. 25, 2006

(65) Prior Publication Data

US 2007/0236579 A1  Oct. 11, 2007

Related U.S. Application Data

(60) Provisional application No. 60/760,768, filed on Jan. 19, 2006.

(51) Int. Cl.
*G06K 9/32* (2006.01)
*H04N 5/228* (2006.01)

(52) U.S. Cl. ........ 382/294; 382/293; 382/295; 382/296; 348/208.99

(58) Field of Classification Search ................ 382/154, 382/289, 296, 298, 305–307, 294
See application file for complete search history.

(56) References Cited

U.S. PATENT DOCUMENTS

| | | | |
|---|---|---|---|
| 4,446,521 A | 5/1984 | Inouye | |
| 4,845,766 A | 7/1989 | Peppers et al. | |
| 4,922,543 A * | 5/1990 | Ahlbom et al. | 382/291 |
| 5,018,216 A * | 5/1991 | Kojima | 382/170 |
| 5,262,856 A * | 11/1993 | Lippman et al. | 375/240.12 |
| 5,745,808 A | 4/1998 | Tintera | |
| 5,821,943 A * | 10/1998 | Shashua | 345/427 |
| 5,832,101 A * | 11/1998 | Hwang et al. | 382/107 |
| 5,832,110 A * | 11/1998 | Hull | 382/168 |
| 5,943,450 A * | 8/1999 | Hwang | 382/298 |
| 6,005,981 A * | 12/1999 | Ng et al. | 382/240 |
| 6,128,047 A * | 10/2000 | Chang et al. | 348/699 |
| 6,160,900 A * | 12/2000 | Miyawaki et al. | 382/107 |
| 6,166,370 A | 12/2000 | Sayag | |
| 6,243,419 B1 * | 6/2001 | Satou et al. | 375/240.13 |
| 6,285,711 B1 * | 9/2001 | Ratakonda et al. | 375/240.16 |
| 6,310,985 B1 | 10/2001 | White | |

(Continued)

FOREIGN PATENT DOCUMENTS

JP  2000047297  2/2000

(Continued)

OTHER PUBLICATIONS

Cain, Stephen "Projection-Based Image Registration in the presence of Fixed-Pattern Noise", Dec. 2001, IEEE Transactions on Image Processing, vol. 10 No. 12 p. 1860-1872.*

(Continued)

*Primary Examiner* — Jason M Repko
*Assistant Examiner* — Gandhi Thirugnanam
(74) *Attorney, Agent, or Firm* — Timothy F. Loomis; Espartaco Diaz Hidalgo

(57) ABSTRACT

The registration of images comprising generating a plurality of projections from a base frame and generating a plurality of projections from a movement frame. Comparing a set of projections from the base frame, with a second set of projections from the movement frame, and generating a global motion vector estimate to add to the base frame.

37 Claims, 18 Drawing Sheets

U.S. PATENT DOCUMENTS

| | | | |
|---|---|---|---|
| 6,381,279 B1* | 4/2002 | Taubman | 375/240.18 |
| 6,418,168 B1* | 7/2002 | Narita | 375/240.16 |
| 6,434,265 B1* | 8/2002 | Xiong et al. | 382/154 |
| 6,522,712 B1 | 2/2003 | Yavuz et al. | |
| 6,693,673 B1 | 2/2004 | Tanaka et al. | |
| 6,750,903 B1* | 6/2004 | Miyatake et al. | 348/218.1 |
| 6,873,360 B1 | 3/2005 | Kawashiri | |
| 6,879,656 B2 | 4/2005 | Cesmeli et al. | |
| 6,996,176 B1* | 2/2006 | Chang et al. | 375/240.16 |
| 6,996,254 B2 | 2/2006 | Zhang et al. | |
| 7,057,645 B1 | 6/2006 | Hara et al. | |
| 7,065,261 B1 | 6/2006 | Horie | |
| 7,414,648 B2 | 8/2008 | Imada | |
| 7,555,166 B2* | 6/2009 | Lee et al. | 382/236 |
| 7,672,503 B2 | 3/2010 | Morisada et al. | |
| 2001/0033693 A1* | 10/2001 | Seol et al. | 382/219 |
| 2002/0097904 A1 | 7/2002 | White | |
| 2002/0164075 A1* | 11/2002 | Acharya et al. | 382/190 |
| 2003/0223010 A1 | 12/2003 | Kaplinsky et al. | |
| 2004/0056966 A1 | 3/2004 | Schechner et al. | |
| 2004/0114831 A1 | 6/2004 | Notovitz et al. | |
| 2004/0145673 A1 | 7/2004 | Washisu | |
| 2004/0160525 A1 | 8/2004 | Kingetsu et al. | |
| 2004/0170246 A1 | 9/2004 | Koenig et al. | |
| 2004/0239775 A1 | 12/2004 | Washisu | |
| 2005/0025342 A1* | 2/2005 | Lee et al. | 382/107 |
| 2005/0036558 A1 | 2/2005 | Dumitras et al. | |
| 2005/0056699 A1 | 3/2005 | Meier et al. | |
| 2005/0094901 A1* | 5/2005 | Seol et al. | 382/305 |
| 2005/0166054 A1* | 7/2005 | Fujimoto | 713/176 |
| 2005/0195221 A1* | 9/2005 | Berger et al. | 345/660 |
| 2005/0232494 A1* | 10/2005 | Fan | 382/224 |
| 2006/0274156 A1* | 12/2006 | Rabbani et al. | 348/208.99 |
| 2007/0076982 A1* | 4/2007 | Petrescu | 382/294 |
| 2007/0166020 A1* | 7/2007 | Quan et al. | 396/52 |
| 2007/0171981 A1* | 7/2007 | Qi | 375/240.24 |
| 2007/0172150 A1* | 7/2007 | Quan et al. | 382/298 |
| 2007/0236579 A1* | 10/2007 | Li et al. | 348/208.99 |
| 2007/0237514 A1* | 10/2007 | Pillman et al. | 396/153 |
| 2008/0165280 A1* | 7/2008 | Deever et al. | 348/497 |
| 2008/0292171 A1 | 11/2008 | Bruder et al. | |
| 2009/0123082 A1* | 5/2009 | Atanssov et al. | 382/236 |
| 2010/0171837 A1* | 7/2010 | Pillman et al. | 348/187 |

FOREIGN PATENT DOCUMENTS

| | | |
|---|---|---|
| JP | 2000224470 | 8/2000 |
| JP | 2004357202 | 12/2004 |
| WO | WO8603866 | 7/1986 |

OTHER PUBLICATIONS

Huafu et al., "A Projection-Based Image Registration Algorithm and Its Application", Brain-Topography, Klumer Academic Publishers—Plenum Publishers, NE, vol. 18, np. 1, Sep. 1, 2005, pp. 47-5R, XP 0154274484, ISSN: 1573-6792.

Sung Cheol Park, et al., Super-Resolution Image Reconstruction: IEEE Signal Processing Magazine (May 2003).

Ben-Ezra, et al., Motion Deblurring Using Hybrid Imaging: IEEE Computer Society Conference on Computer Vision and Pattern Recognition (CVPR'03).

Xing Yu Qi, et al., Motion Deblurring for Optical Character Recognition: IEEE Computer Society Conference on Computer Vision and Pattern Recognition (ICDAR'05).

Moshe Ben-Ezra, et al., Motion-Based Motion Deblurring: IEEE Transactions on Pattern Analysis and Machine Intelligence, vol. 26 No. 6 (Jun. 2004).

Cain, S. et al.: "Projection-Based Image Registration in the Presence of Fixed-Pattern Noise," IEEE Transactions on Image Processing, vol. 10, No. 12, pp. 1860-1861, (Dec. 2001), XP011025877, ISSN: 1057-7149.

Sauer, K. et al.: "Efficient Block Motion Estimation Using Integral Projections," IEEE Transactions on Circuits and Systems for Video Technology, vol. 6, No. 5, pp. 514-518, (Oct. 1966), XP011014326, ISSN: 1051-8215.

Kim, J. et al.: "A Fast Feature-Based Block Matching Algorithm Using Integral Projections," IEEE Journal on Selected Areas in Communications, vol. 10, No. 5, pp. 968-971, (Jun. 1992), XP000276102, ISSN: 0733-8716.

International Search Report, PCT/07/060804—International Search Authority, European Patent Office—Dec. 27, 2007.

The International Preliminary Report on Patentability, PCT/07/060804—The International Bureau of WIPO—Jul. 22, 2008.

Written Opinion, PCT/07/060804—International Searching Authority—European Patent Office—Dec. 27, 2007.

* cited by examiner

HAND JITTER REDUCTION FOR COMPENSATING FOR LINEAR DISPLACEMENT

CROSS-RELATED APPLICATIONS

This application claims the benefit of provisional U.S. Application Ser. No. 60/760,768, entitled "HAND JITTER REDUCTION SYSTEM DESIGN," filed Jan. 19, 2006. This disclosure is related to co-pending patent application Ser. No. 11/534,993, entitled "HAND JITTER REDUCTION SYSTEM FOR CAMERAS," and co-pending patent application Ser. No. 11/534,935, entitled "HAND JITTER REDUCTION COMPENSATING FOR ROTATIONAL MOTION," both co-filed with this application on Sep. 25, 2006.

TECHNICAL FIELD

This disclosure relates to digital image processing and, more particularly, a hand jitter reduction compensating for linear displacement.

BACKGROUND

The demand for multimedia applications in mobile communications has been growing at an astounding rate. Today, a user can send and receive still images, as well as download images and video from the Internet, for viewing on a mobile unit or handset. The integration of the digital camera into the mobile unit has further contributed to the growing trend in mobile communications for multimedia functionality.

Given the limited amount of resources like battery capacity, processing power, and transmission speed associated with a mobile unit, effective digital imaging processing techniques are needed to support multimedia functions. This requires the development of more sophisticated hardware and software that reduces computational complexity for multimedia applications while maintaining the image quality. The development of such hardware and software leads to lower power consumption and longer standby time for the mobile unit.

One facet of the digital imaging process involves removing blurriness from a picture. Blurriness may be caused by hand jitter. Hand jitter is caused by the movement of the user's hand when taking a digital picture with a camera. Even if the user is unaware of the movement, the hand may be continually moving. The movements are relatively small, but if the movements are large relative to the exposure time, the digital picture may be blurry. An object or person in the picture may appear to be moving. Blurriness may also be caused by an object/person moving when a picture is being taken. Blurriness may also be caused by limitations of the optical system used to capture the pictures.

Under low lighting conditions, a digital camera, for example, one found in a mobile unit, takes a longer time to register a picture. The longer exposure time increases the probability that the slight movements produced by the hand may lead to blurriness. Similarly, the longer exposure time increases the chance that the movement by the object/person may be large relative to the exposure time.

Current techniques for compensating for camera movements involve the use of small gyroscopes or other mechanical devices. None of the techniques seem to have an acceptable way to digitally compensate for the camera movements, especially under low lighting conditions. It would be desirable to reduce the amount of blurriness in a digital picture with efficient processing resources suitable for mobile applications under all conditions.

SUMMARY

The details of one or more configurations are set forth in the accompanying drawings and the description below. Other features, objects, and advantages will be apparent from the description, drawings and claims.

Multiple frame registration may be implemented by capturing multiple frames and checking the parity of the frames to determine how to register them. Registration takes place between a base frame and a movement frame. For any frame a set of vertical projections and horizontal projections may be generated. A projection is the summing of a column in a frame and/or the summing of a row in a frame. The set of projections in a base frame may be correlated (known as projection correlation) to a set of projections in a movement frame. Projections may be filtered. The projection correlation generates a set of values, and the minimum value for each set (vertical and horizontal) generates a global motion vector. The global motion vector may then be added to a base frame to yield a registered frame. If there are multiple registered frames, there may be various ways to select a registered base frame and registered movement frame. One of the various ways involves selecting the basement frame and movement frame based on a parity of the total number of total frames to be processed in a row from a frame flow-tree. Frame registration may be an iterative process that may terminate early if the global motion vector is within a certain tolerance or threshold in both the vertical and horizontal direction.

One of the advantages of multiple frame registration is to reduce noise and blurriness due to linear (vertical and/or horizontal) movements as a result of hand jitter in a digital picture.

BRIEF DESCRIPTION OF DRAWINGS

Various embodiments are illustrated by way of example, and not by way of limitation, in the accompanying drawings.

Figure 9:
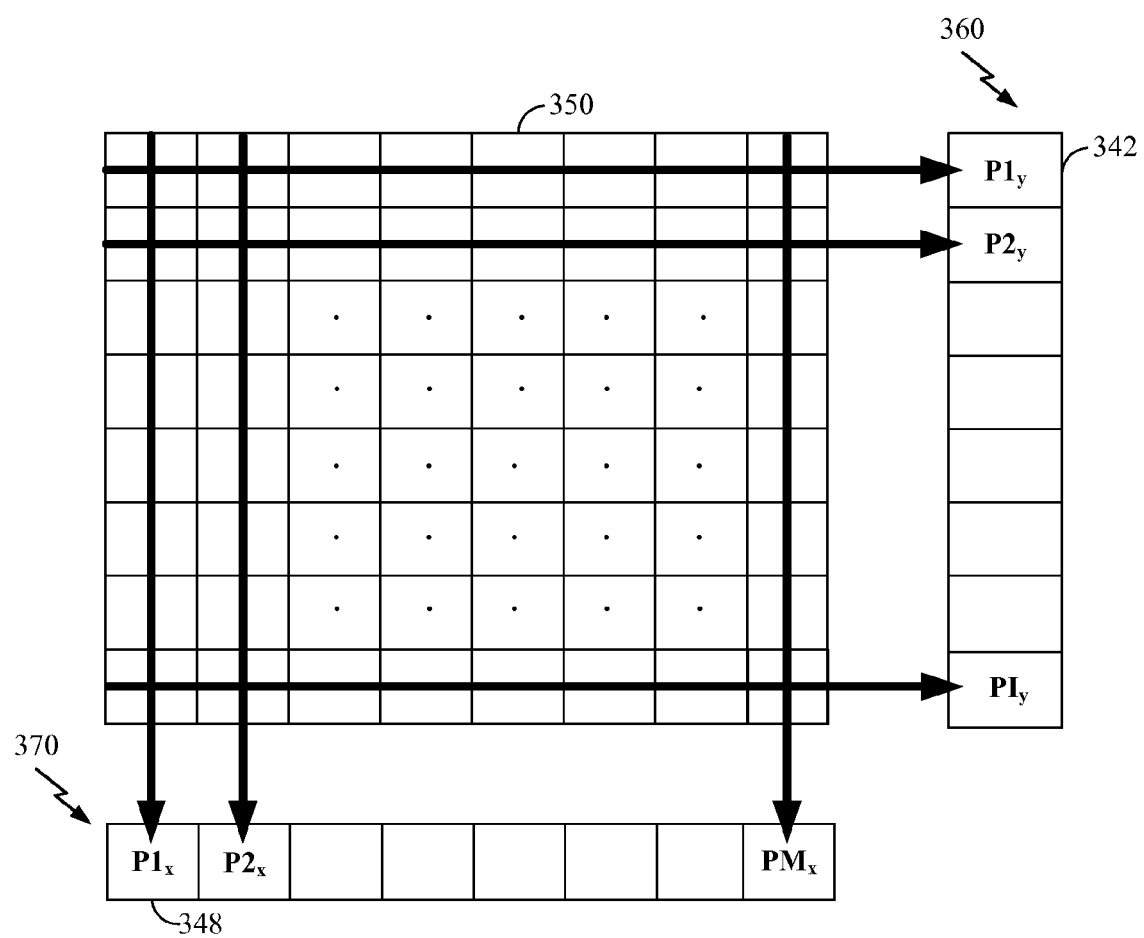

Illustrated in FIG. 9, are a horizontal set of projections on a frame and a vertical set of projections on a frame.

Figure 10:
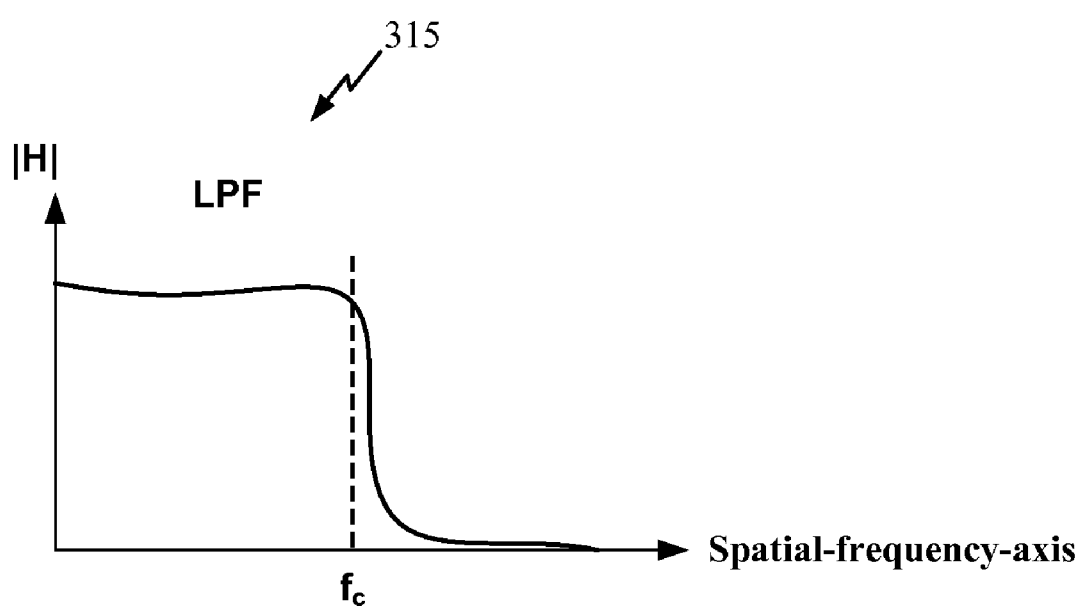

FIG. 10 illustrates a frequency response of a low pass filter.

Figure 11:
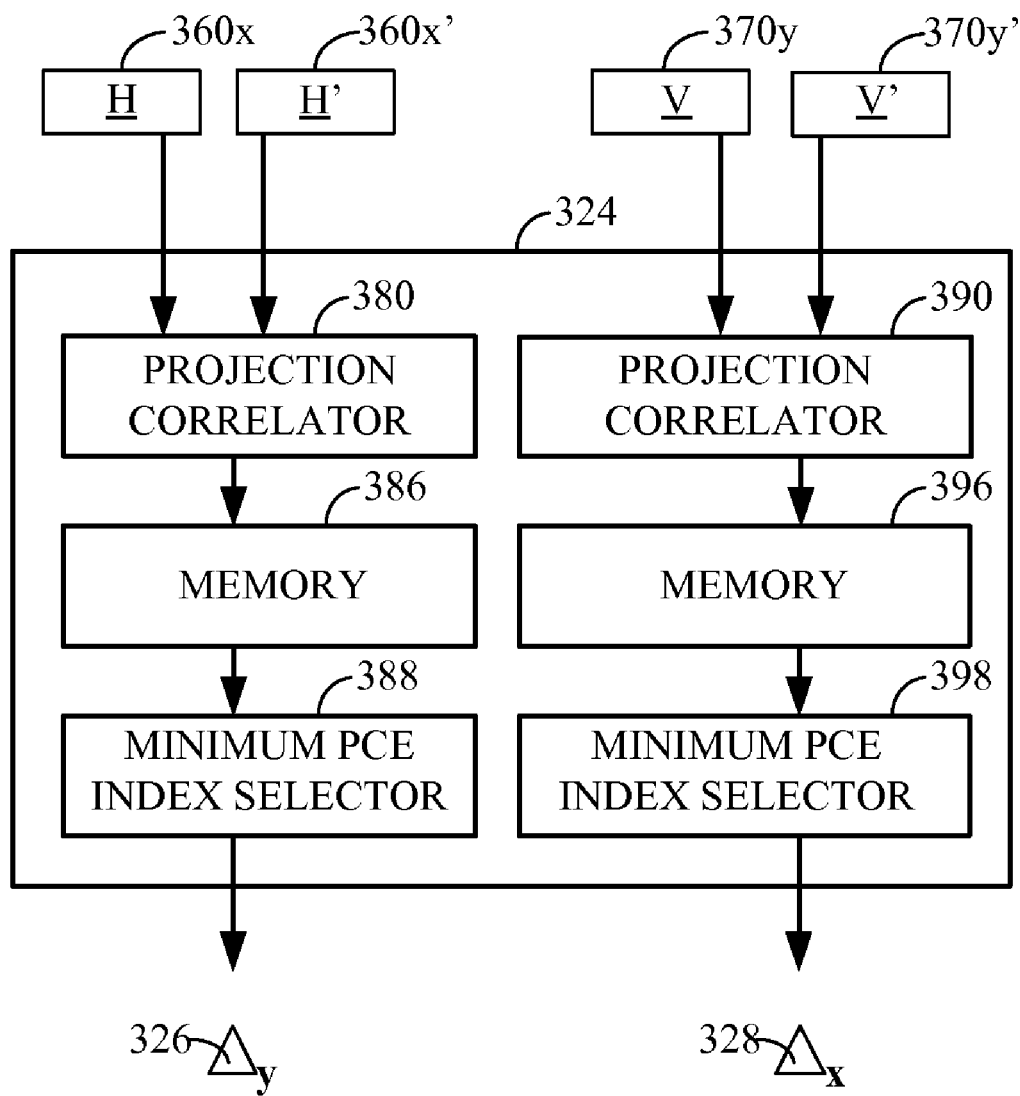

Illustrated in FIG. 11, is a possible configuration of a global motion vector estimator.

Figure 12:
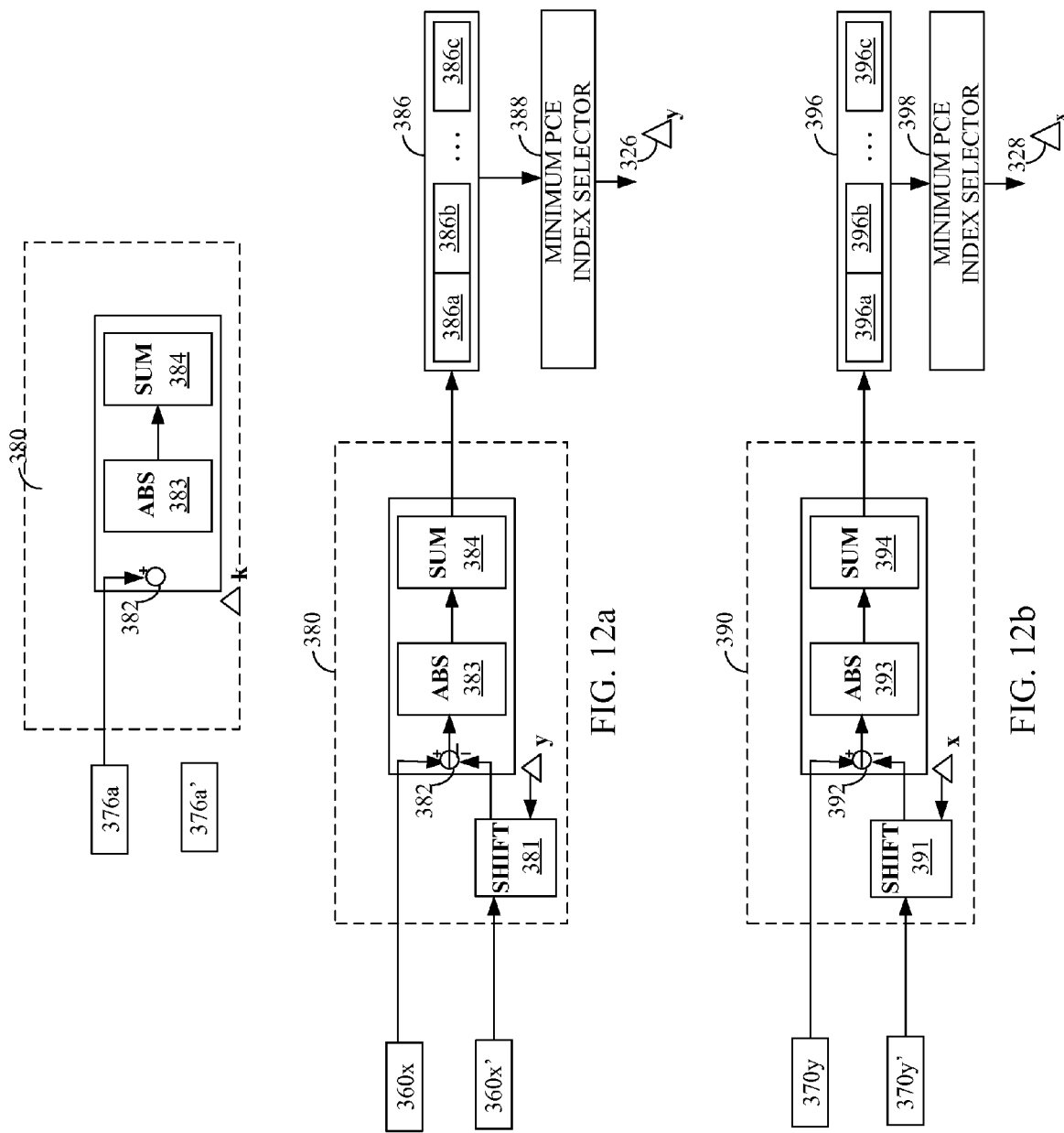

FIG. 12a and FIG. 12b illustrate more details of a global motion vector estimator.

Figure 13:
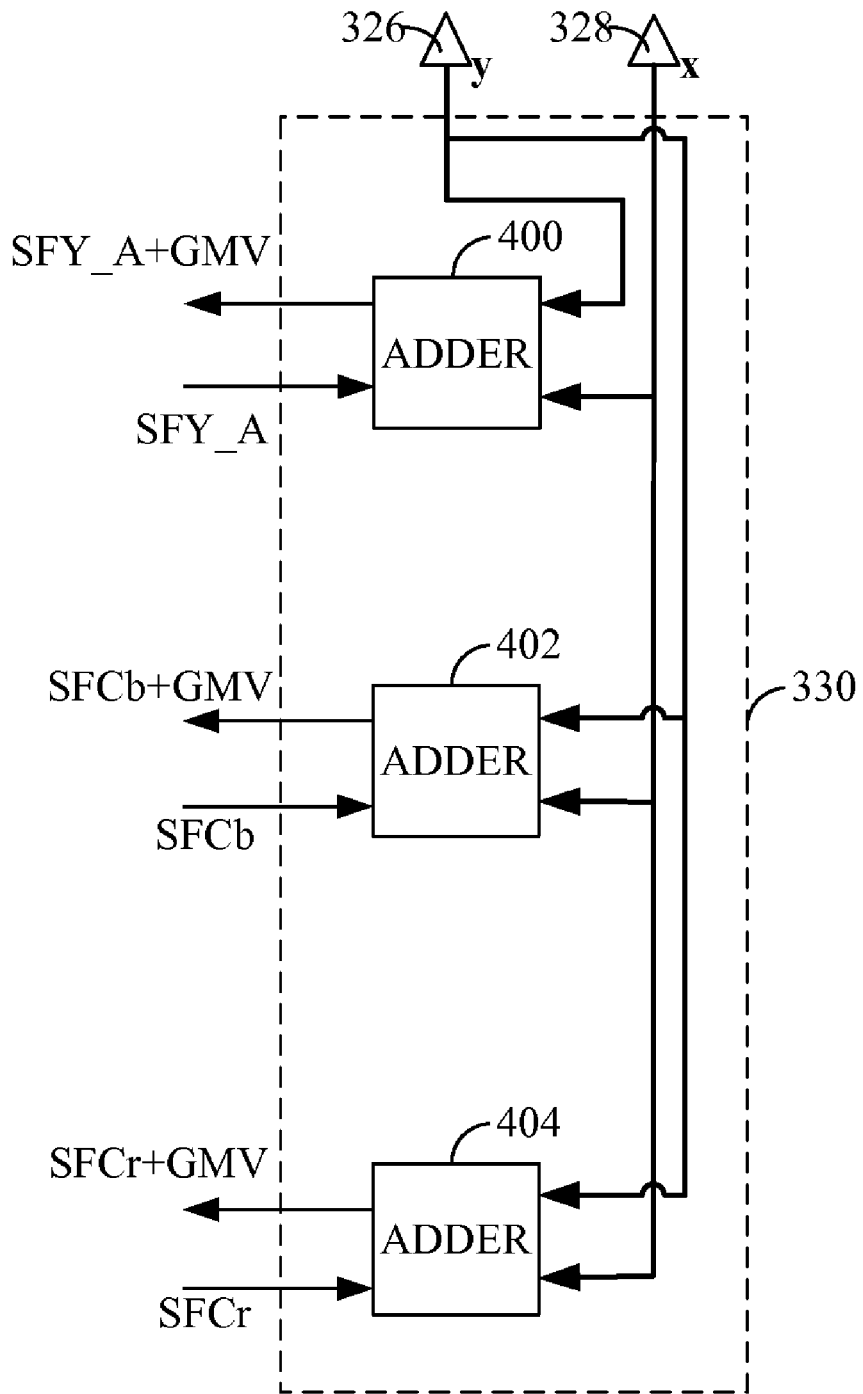

One architectural configuration of a frame registrator is shown in FIG. 13.

Figure 14:
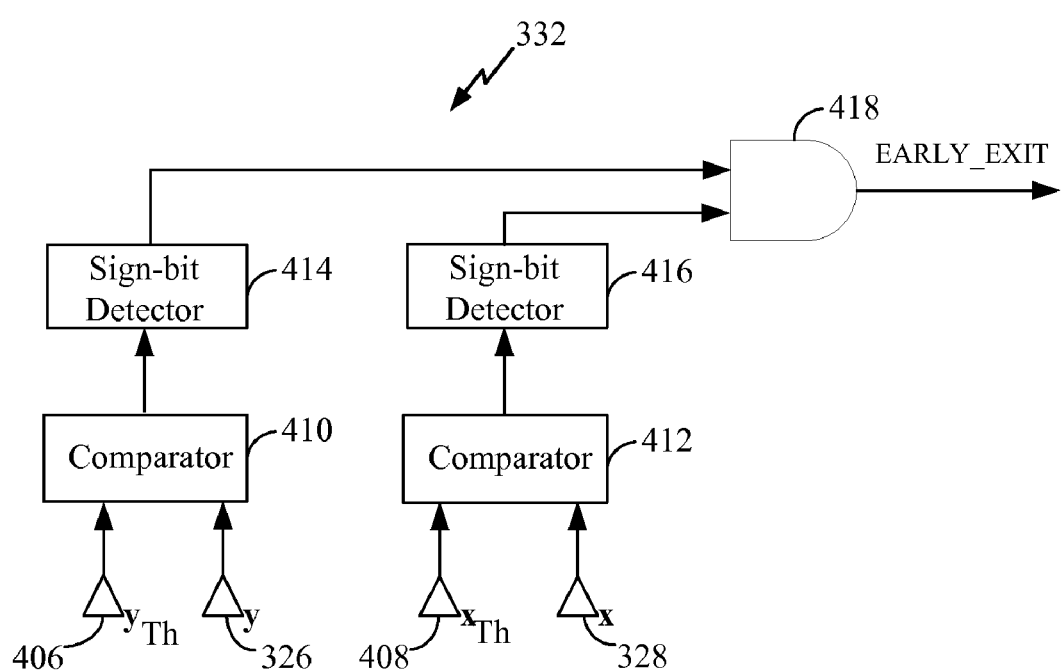

FIG. 14 illustrates a possible configuration of an early terminator.

Figure 15:
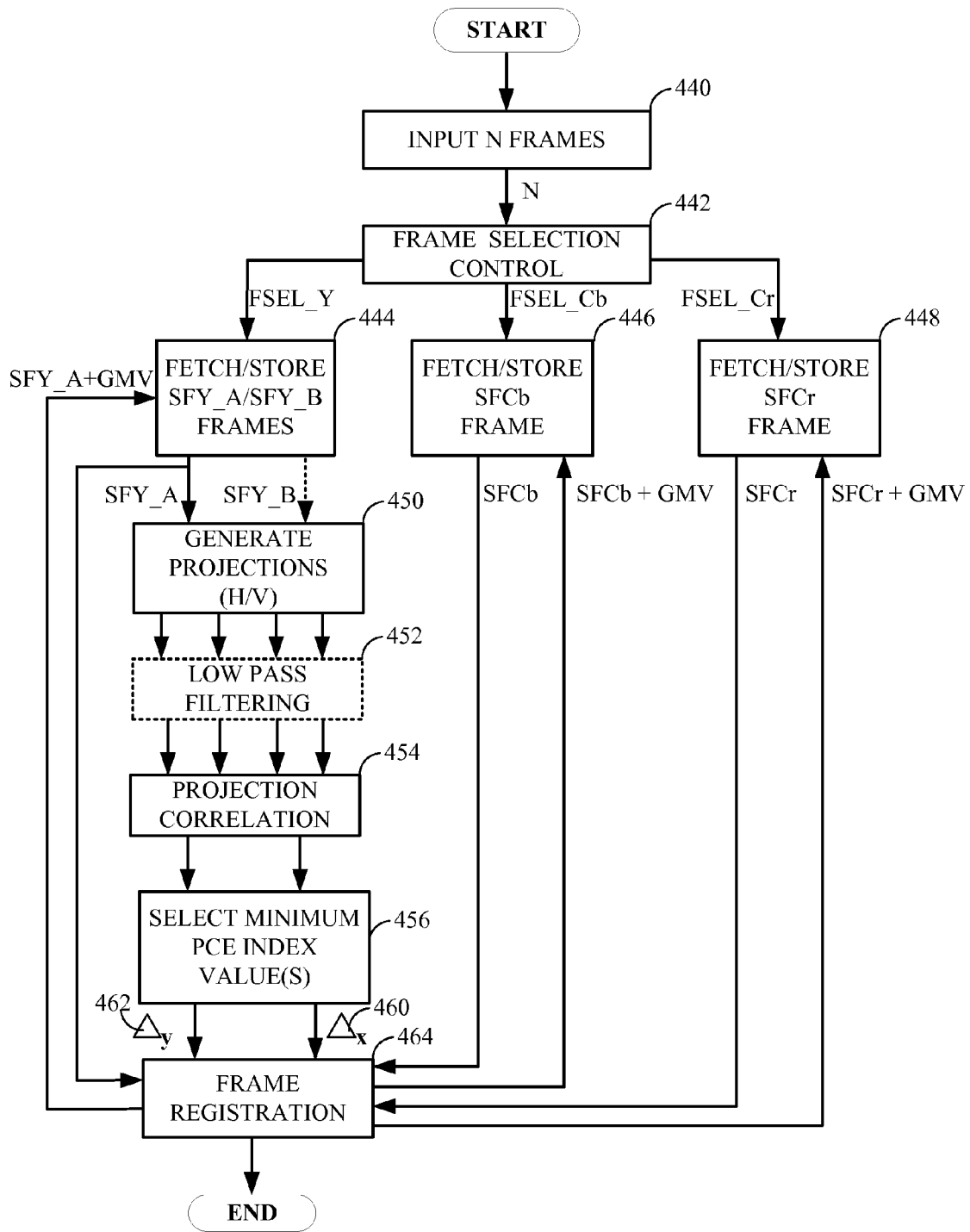

FIG. 15 is a flow chart illustrating a possible method of frame registration of images.

Figure 16:
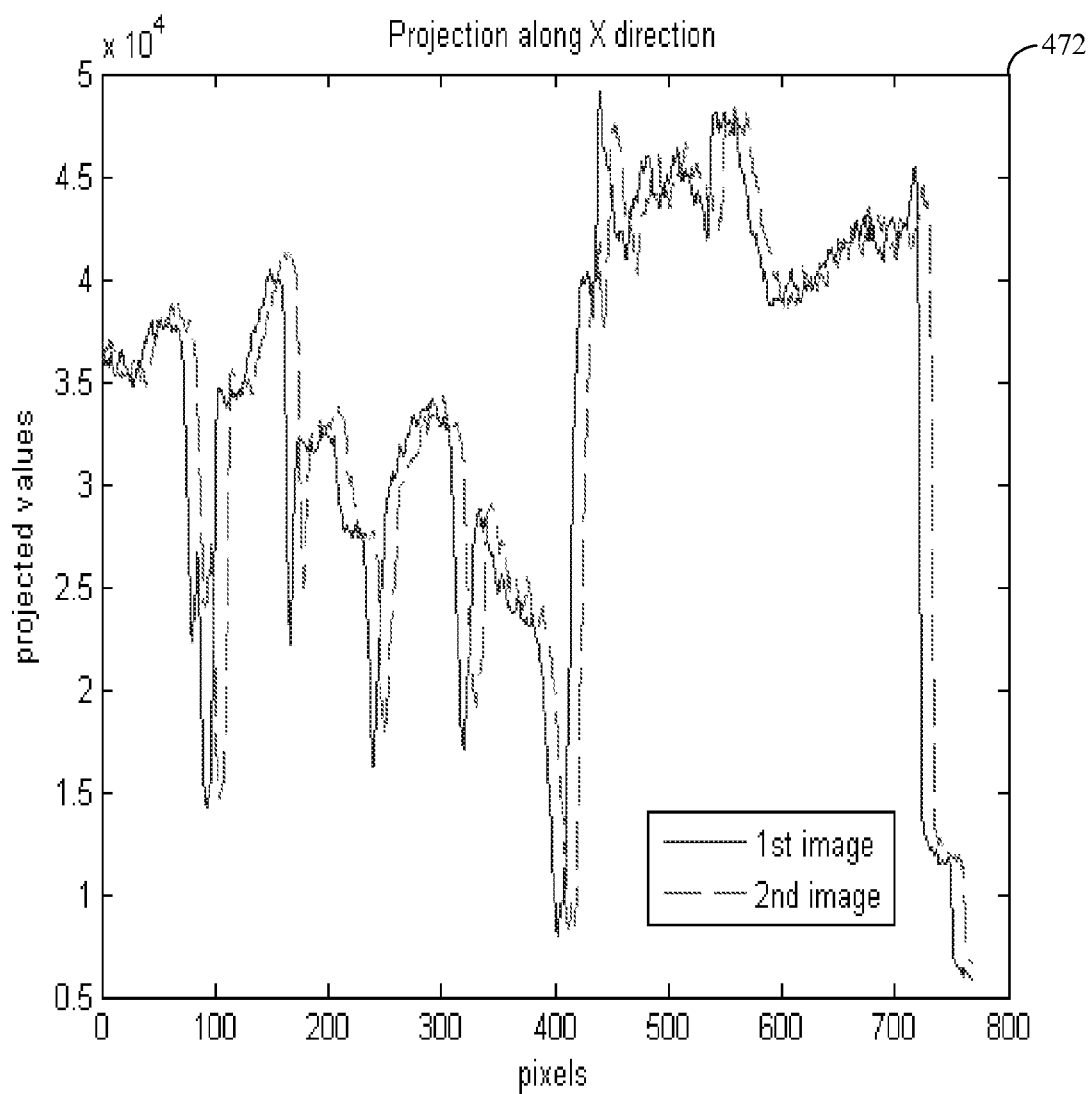

A graph for a set of horizontal projections for a base frame and a movement frame is illustrated in FIG. 16.

Figure 17:
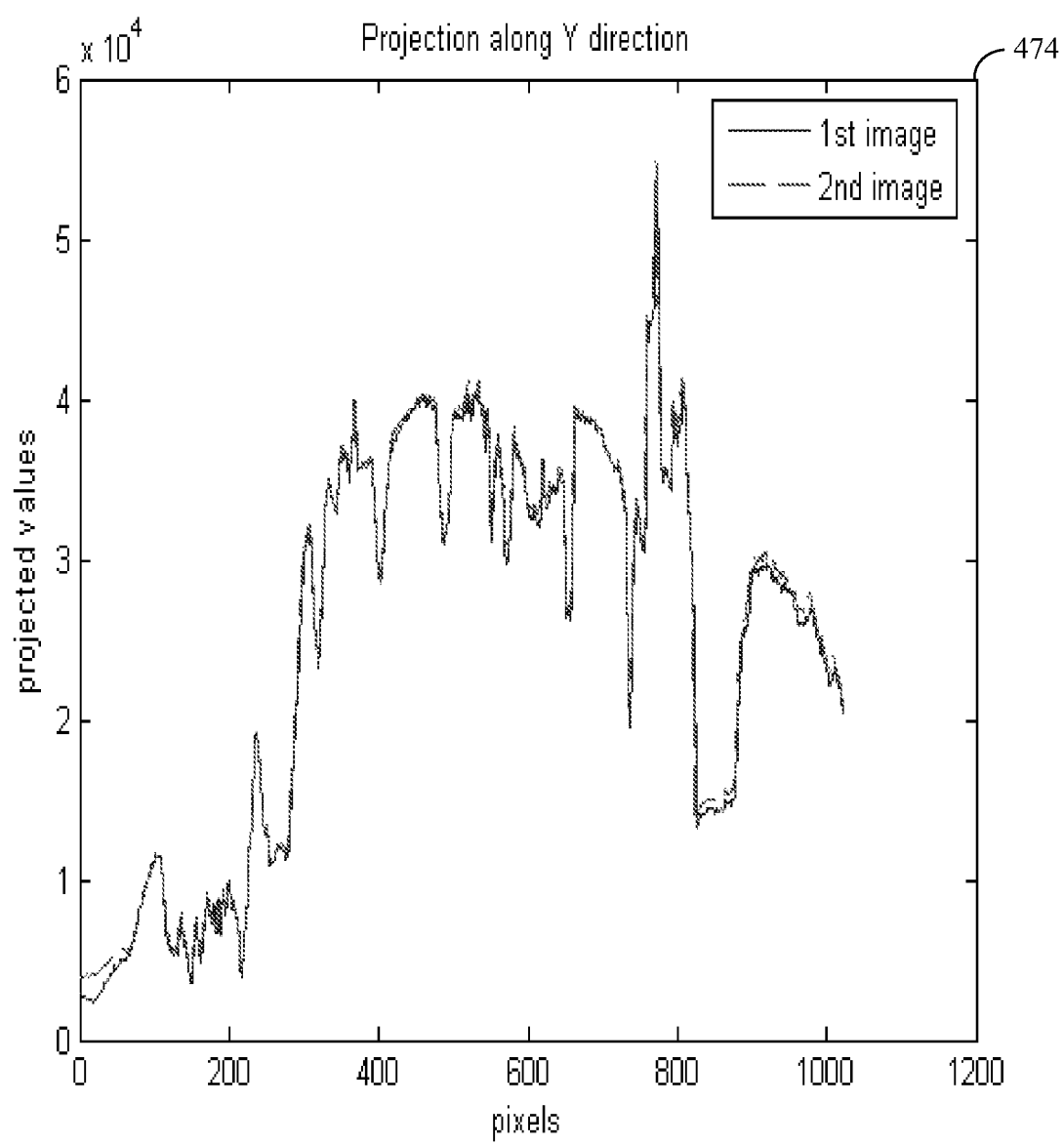

A graph of a set of vertical projections for a base frame and a movement frame is illustrated in FIG. 17.

DETAILED DESCRIPTION

The word "exemplary" is used herein to mean "serving as an example, instance, or illustration." Any embodiment, configuration or design described herein as "exemplary" is not necessarily to be construed as preferred or advantageous over other embodiments or designs. In general, described herein, is a novel method and apparatus to reduce blurriness and/or noise in digital pictures by generating a global motion vector and using the global motion vector for frame registration.

In conventional camera devices, when a user takes a snapshot (currently done by pressing a button), mostly only one frame is used to generate a picture. Methods which employ using more than one frame to generate a picture often are not successful because they yield poor results. With conventional camera devices, the picture may be blurry due to movements produced by the user's own hand movements, these hand movements are known as hand jitter. Conventional camera devices also are challenged by the amount of time required to expose a picture. Under low lighting conditions, the exposure time is typically increased. Increasing the exposure time increases the amount of noise that a user may see due to low lighting conditions as well as increases the probability that hand jitter will produce a blurry picture. Currently, camera devices may contain small gyroscopes to compensate for the hand jitter produced by the user. However, there are many challenges faced when placing gyroscopes on mobile units. Even when these challenges are overcome, the digital hand jitter reduction techniques may be used in combination with devices that have gyroscopes. Current camera devices may also scale the gain under low lighting conditions. Unfortunately, simply increasing the gain amplifies the noise present as a result of the low light level. The result is often a picture of poor quality. Similarly, digital compensation for hand jitter does not always provide adequate results. However, with the techniques disclosed throughout this disclosure, it has been possible to reduce hand jitter, as well as reduce noise under lower light conditions.

Figure 1:
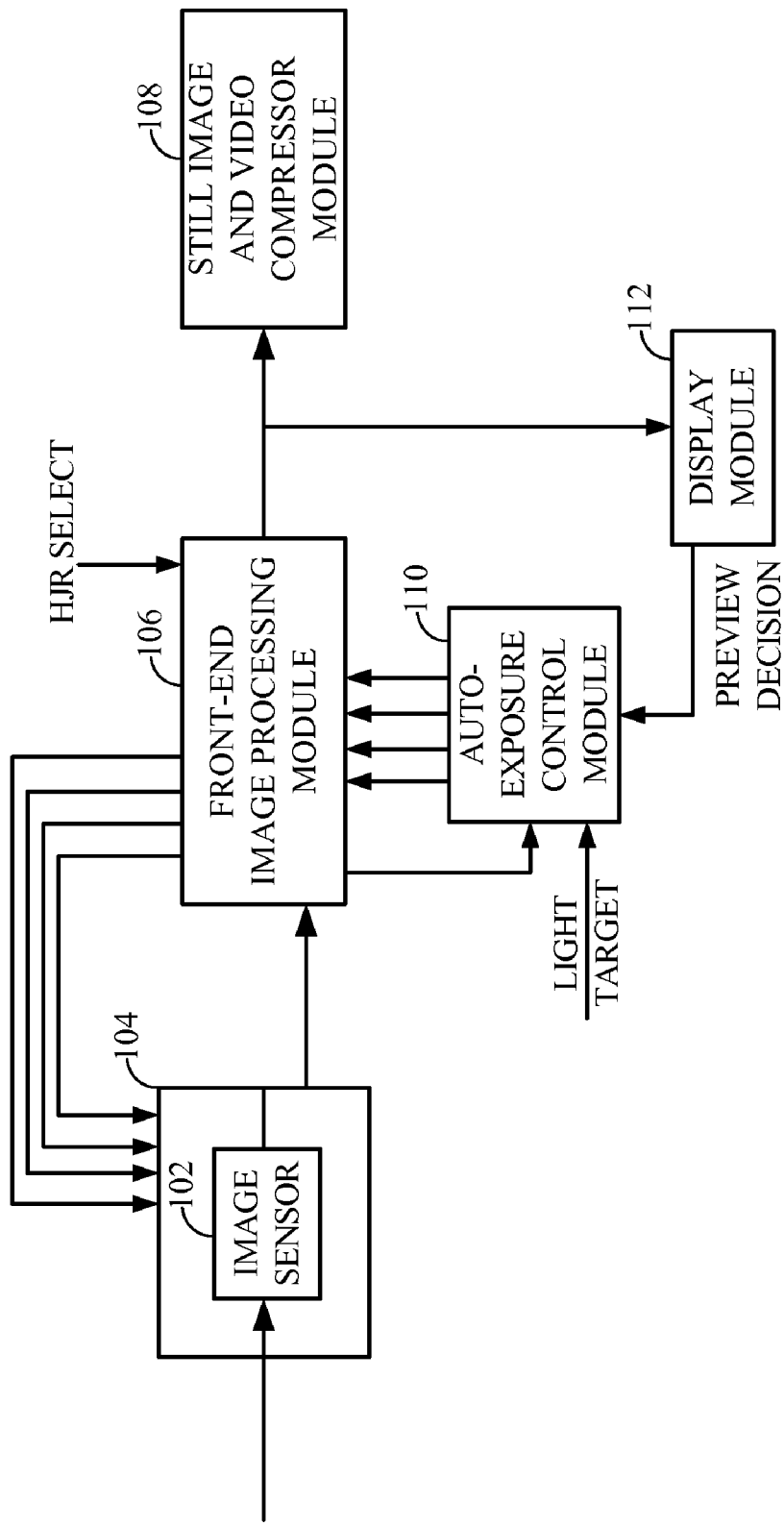
FIG. 1 is a block diagram illustrating a digital imaging process.

FIG. 1 is a block diagram illustrating a digital imaging process suitable for a camera device integrated into a mobile unit. The mobile unit may be a wireless phone, personal digital assistant (PDA), laptop computer, or any other mobile wireless device. A lens (not shown) may be used to focus an image onto an image sensor 102, in an image sensor module 104. In one configuration, image sensor module 104 may have a memory for storing gain and exposure parameters. Image sensor module 104 may also have a control driver for modifying gain and auto-exposure parameters. In another configuration, image sensor module 104 may be coupled to an integrated circuit, such as a Mobile Station Modem (MSM™), or other module which has a memory and/or control driver for storing and modifying gain and auto-exposure parameters. The image sensor 102 may be a charge-coupled device (CCD), a complimentary metal oxide semiconductor (CMOS) image sensor, or any other suitable image sensor. In at least one configuration of the image sensor 102, an array of semiconductors may be used to capture light at different pixels of the image. A color filter array (CFA) (not shown) positioned in front of the image sensor 102 may be used to pass a single color (i.e., red, green or blue) to each semiconductor. The most common CFAs are RGB and CMYG patterns. The image sensor module 104 may drive or control image sensor 102 to modify the gain, and or exposure time.

Before a user presses the button to take a snapshot and produce a digital picture, a preview mode, may capture a series of frames produced by the image sensor 102. The whole frame or a sub-part of the frame is referred to as an image or interchangeably a picture. For illustrative purposes, it is convenient to discuss the images being processed as a series of frames. Although it should be recognized that not the entire frame need be processed when using a front-end image processing module 106. In addition, the sequence of frames is also known as a stream. The stream may be provided to a front-end image processing module 106 where they are de-mosaiced in order to obtain full RGB resolution as an input to the still image and video compressor 108. As the stream passes through the front-end image processing module 106, in the preview mode, statistics may be collected on frames that aid with the production of the digital picture. These statistics may be, but are not limited to, exposure metrics, white balance metrics, and focus metrics.

The front-end image processing module 106 may feed various signals, which help control the image sensor 102, back into the image sensor module 104. The still image and video compressor 108 may use JPEG compression, or any other suitable compression algorithm. An auto-exposure control module 110 may receive a value proportional to the light level being processed by the front-end image processing module 106, and compare it to a stored light target, in order to aid in at least one of the functions of the front-end image processing module 106. Images that are processed through the modules in front-end image processing module 106 are part of digital frames. The stream may also be sent to a view finder which may be located in display module 112. In the preview mode, a preview decision from the display module 112 may be used in the control of the auto-exposure.

The preview mode in a mobile unit having a digital camera may be used in either a normal mode or a hand jitter reduction (hjr) mode. The user may select the hjr mode (shown as hjr select in FIG. 1) through a user-interface either through a menu or manually. Auto-exposure parameters such as gain, auto-exposure time, frame rate and number of frames to process, may be determined within moments after the user presses the button to take a snapshot and produce a digital picture. The collected statistics may be used to determine auto-exposure parameters used during the snapshot in both the normal mode and the hjr mode. Hence, after the user presses the button, the image processing may be different between hjr mode and normal mode. Before the user presses the button the preview mode is processing images as it would in normal mode, even if the hjr mode has been selected.

Figure 2:
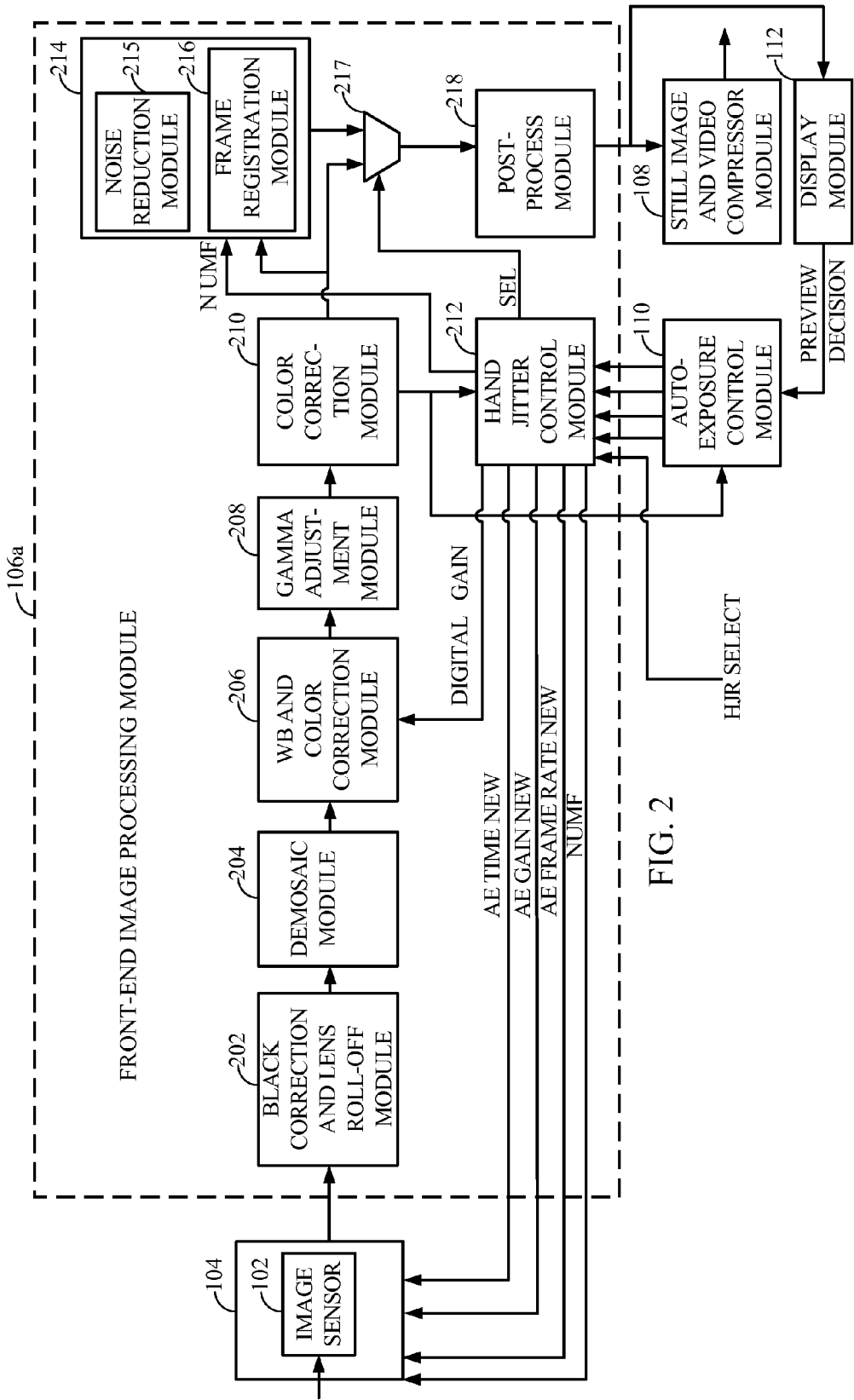
FIG. 2 is a block diagram illustrating the functionality of a pre-processing module in a digital image processing system.

FIG. 2 is a block diagram illustrating the functionality of one configuration of one front end image processing module 106a in a digital image processing system. The front-end image processing module 106a may be used to compensate for differences between the responses of human visual system and sensor signals generated by the image sensor 102. These differences may be corrected using various processing techniques including, by way of example, black correction and lens rolloff 202, de-mosaic module 204, white balance and color correction 206, gamma adjustment 208, and color conversion 210. These processes are represented in FIG. 2 as separate processing modules, but alternatively may be performed using a shared hardware or software platform. Moreover, these modules may include multiple image processing modules that perform the same function, thereby allowing the function to be performed in parallel on different images.

After the color conversion module processes a frame, three color image-components (Y, Cb, and Cr) may be may be sent to hand jitter control module 212. The various parameters from the auto-exposure control module may be fed into hand jitter control module 212. Hand jitter control module 212 may serve multiple purposes. Hand jitter control module 212, may determine the image processing that takes place after the snapshot. Hand jitter control module 212 may detect the value of hjr select, and determine if hand jitter reduction (hjr) needs to be performed. Even though the user has selected hjr mode, hand jitter control module 212 may determine that image processing as is done in normal mode may take place. Hand jitter control module 212 may determine that image processing in hjr mode take place. Generating a digital picture image processing in hjr mode may include capturing a single frame or multiple frames. If hand jitter control module 212 determines that multiple frames will be captured, after passing through hjr control module, the frames may be sent to noise reduction/frame registration module 214, along with a parameter which indicates how many frames may be processed by noise reduction/frame registration module 214. If a single frame is to be processed, noise reduction may take place on the single frame through the use of a noise reduction module 215. Noise reduction module may be a bayer filter, or other similar filter. If multiple frames are to be processed, noise reduction/frame registration module 214 may buffer the number of frames, numf, specified by hand jitter control module 212, and perform frame registration on them. Depending on how many frames and the light level, the purpose of the multiple frame registration may serve the purpose of noise reduction and/or blur reduction. Multiple frame registration may be done by a frame registration module 216.

If hand jitter control module 212 determines that image processing takes place as in normal mode, noise reduction/frame registration module 214 may not be used, and the output from color correction module 210, for example, may be used, even though the user selected hjr mode. Depending on what image processing (the one in normal node or the one in hjr mode) is determined by hand jitter control module 212, a signal (sel) may be used to select which multiplexer 217 output to send to post-process module 218. The output of post-process module 218 may be sent to still and image video compressor 108 and/or display module 112.

In addition to outputting a select signal (sel) and the number of frames to use for noise reduction and/or frame registration, hand jitter control module 212 may also output other parameters: new auto-exposure frame rate (ae fr_new), new auto-exposure gain (ae gain_new), new auto-exposure time (ae time_new), and the number of frames to be processed (numf). These parameters may be sent to image sensor module 104 to control image sensor 102. A digital gain may also be output by hand jitter control module 212 and may be applied at any module after the image sensor module 104. As an example, the digital gain may be applied during the white-balance/color correction module 206.

Those ordinarily skilled in the art will recognize that while pixels are normally described, sub-pixels, or multiple pixels may also be used as inputs into front-end image processing module 106a. Furthermore, a sub-set of these image-components or other forms: RGB, and spatial-frequency transformed pixels, may also be sent to a hand jitter control module, such as hand jitter control module 212.

As mentioned previously, the frame registration module 216 may used to reduce the amount of blurriness or reduce noise in a digital picture with efficient processing resources suitable for mobile applications. Currently, a normal exposure time for a picture may be around 150-300 milli-seconds (ms). Instead of capturing one picture (frame) in 150-300 ms, N frames may be captured and processed at reduced exposure times prior to frame registration. In order to reduce the amount of blurriness in a picture, frame registration module 216 compensates for the amount of rotational movement between any two frames amongst the N frames being processed at the reduced exposure times.

Typically in a frame registration module 216, N frames are processed by iteratively selecting a pair of frames at a time: a base frame and a movement frame. Compensation of the amount of horizontal and vertical movement, between the base frame and the movement frame, is accomplished by estimating a global motion vector during every iterative frame pair selection and "registering" the movement frame to the base frame. After computing an estimate of the global motion vector between the horizontal and vertical movement frame relative to the base frame, the movement frame is registered to the base frame by adding the estimated global motion vector to the base frame. The registered frame represents the compensation of the base frame due to the estimated horizontal and vertical movement between the base frame and the movement frame. The registered frame may be used as a new base frame or may be used as a new movement frame. The selection of how any frame, registered or not registered, depends on the parity of the number of frames being processed and may be configurable. The frame selection process is discussed in more detail in FIGS. 5A-5F.

Figure 3:
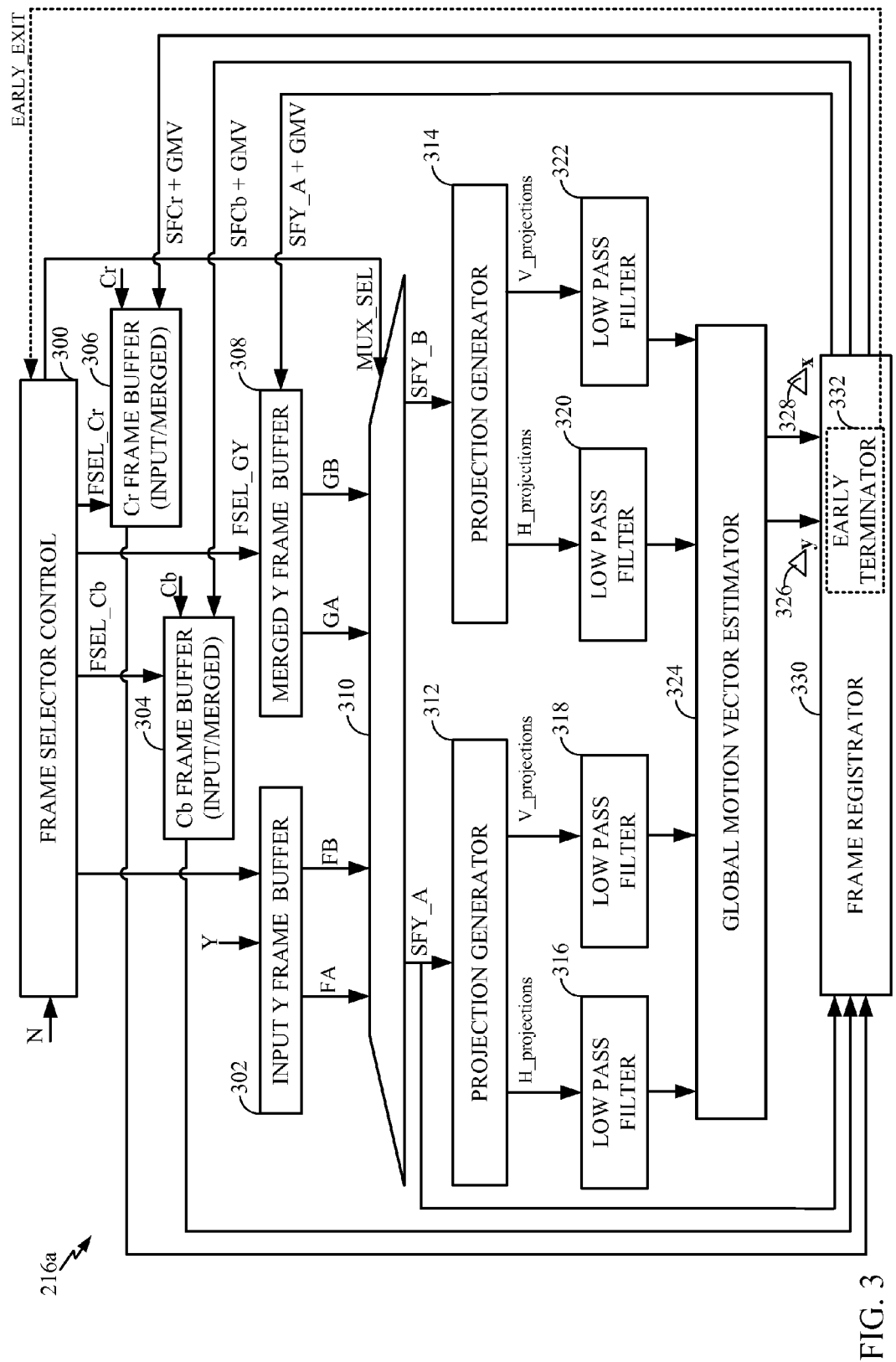
FIG. 3 is a hardware block diagram of one architectural configuration illustrating a frame registration module for estimating a global motion vector.

The frame selection process may be implemented by a frame selector control 300, seen in FIG. 3. FIG. 3 is a hardware block diagram of one architectural configuration illustrating a frame registration module 216a for estimating a global motion vector. The number of frames being processed by frame registration module 216a may be predetermined prior to frame registration. Frame selector control 300 may use a configurable look-up table (see discussion for FIGS. 5A-5F) to select amongst frames fa, fb, ga, or gb. The two unregistered frames being processed are designated as fa and fb. The two registered frames being processed are designated as ga and gb.

After the color conversion process, three color image-components (Y, Cb, and Cr) may be input into a frame registration module 216a. However, those ordinarily skilled in the art will recognize that a sub-set of these image-components or other forms may be used, such as RGB; and spatial-frequency transformed pixels of these image-components. Furthermore, while pixels are normally used, sub-pixels, or multiple pixels may also be used as inputs. Image-component Y may be routed to input Y frame buffer 302, image-component Cb may be routed to input/merged Cb frame buffer 304, and image-component Cr may be routed to input/merged Cr frame buffer 306. Frame registration may be carried out on all three image-components (Y, Cb, and Cr). Estimation on a global motion vector need only be performed on one of the image-components, although it may be performed on more than one components. As an example, the Y image-component may be used to estimate a global motion vector. As such, a registered frame may be routed to merged Y frame buffer 308. In addition, the frame registration process may be carried out on only part of a frame if desired.

Frame selector 300 may have up to five outputs, mux_sel, fsel_Cb, fsel_Cr, fsel_fY, and fsel_gY. From frames fa, fb, ga, or gb, mux_sel selects from mux 310 which two pair of frames may be used to estimate a global motion vector between a base frame and a movement frame. A base frame is designated by frame sfY_a, and a movement frame is designated by a movement frame sfY_b. Selection of frame fa and frame fb may be through signal fsel_fY, while selection of frame ga and frame gb may be through signal fsel_gY. Similarly, fsel_Cb and fsel_Cr may be used to select which Cb (sfCb) and Cr (sfCr) frames may be used for frame registration of the Cb and Cr image-components.

Frame sfY_a may be routed to a projection generator 314, which may generate I horizontal projections and M vertical projections. Interpolation or decimation of rows in a frame may also be implemented, i.e., the number of horizontal projections generated in a frame may be less (decimation) than I, or more (interpolation) than I. Hence, there may be D horizontal projections, where D represents the number of decimated rows, D is less than I. There may be L horizontal projections, where L represents the number interpolated rows, L is more than I. The horizontal projections, whether interpolated, decimated, or neither) may be low pass filtered via low pass filter 316. The set of horizontal projections (whether filtered or not) {H(0), H(1), . . . H(I-1)}, may be represented by a vector, and is denoted by $\overline{H}$. Analogously, interpolation or decimation of columns in a frame may also be implemented. The vertical projections (whether interpolated, or neither) may be low pass filtered via low pass filter 318. The set of vertical projections (whether filtered or not) {V(0), V(1), . . . V(M-1)}, may be represented by a vector, and is denoted by $\overline{V}$.

Similarly, frame sfY_b may be routed to a projection generator 314, which may generate horizontal and vertical projections. Interpolation or decimation of rows in a frame may also be implemented. The horizontal projections (whether interpolated, decimated, or neither) may be low pass filtered via low pass filter 320. The set of horizontal projections {H'(0), H'(1), . . . H'(I-1)}, may be represented by a vector, and is denoted by $\overline{H'}$. Analogously, interpolation or decimation of columns in a frame may also be implemented. The vertical projections (whether interpolated, decimated, or neither) may be low pass filtered via low pass filter 322. The set of vertical projections (whether filtered or not) {V'(0), V'(1), . . . V'(M-1), may be represented by a vector, and is denoted by $\overline{V'}$.

Global motion vector estimator 324 receives four sets of data, namely input vectors $\overline{H}$, $\overline{V}$, $\overline{H'}$ and $\overline{V'}$, and generates global motion vector estimate $\overline{gmv}$ 329, where gmv is ($\Delta_x$, $\Delta_y$). Global motion vector gmv 329 may be added to sfY_a, sfCb, and sfCr in frame registrator 330. The resulting registered frames, namely, sfY_a+gmv, sfCb+gmv, sfCr+gmv, may be stored in buffer memories merged_Y frame buffer, input/merged Cb frame buffer, and input/merged Cr frame buffer, respectively. After the first iteration of frame registration(s), frame ga may be available for the second iteration of frame registration(s). Early terminator 332 may determine if the global motion vector estimate is within a certain tolerance and cause an early exit condition and terminate the frame registration earlier than the processing of N frames.

Figure 4:
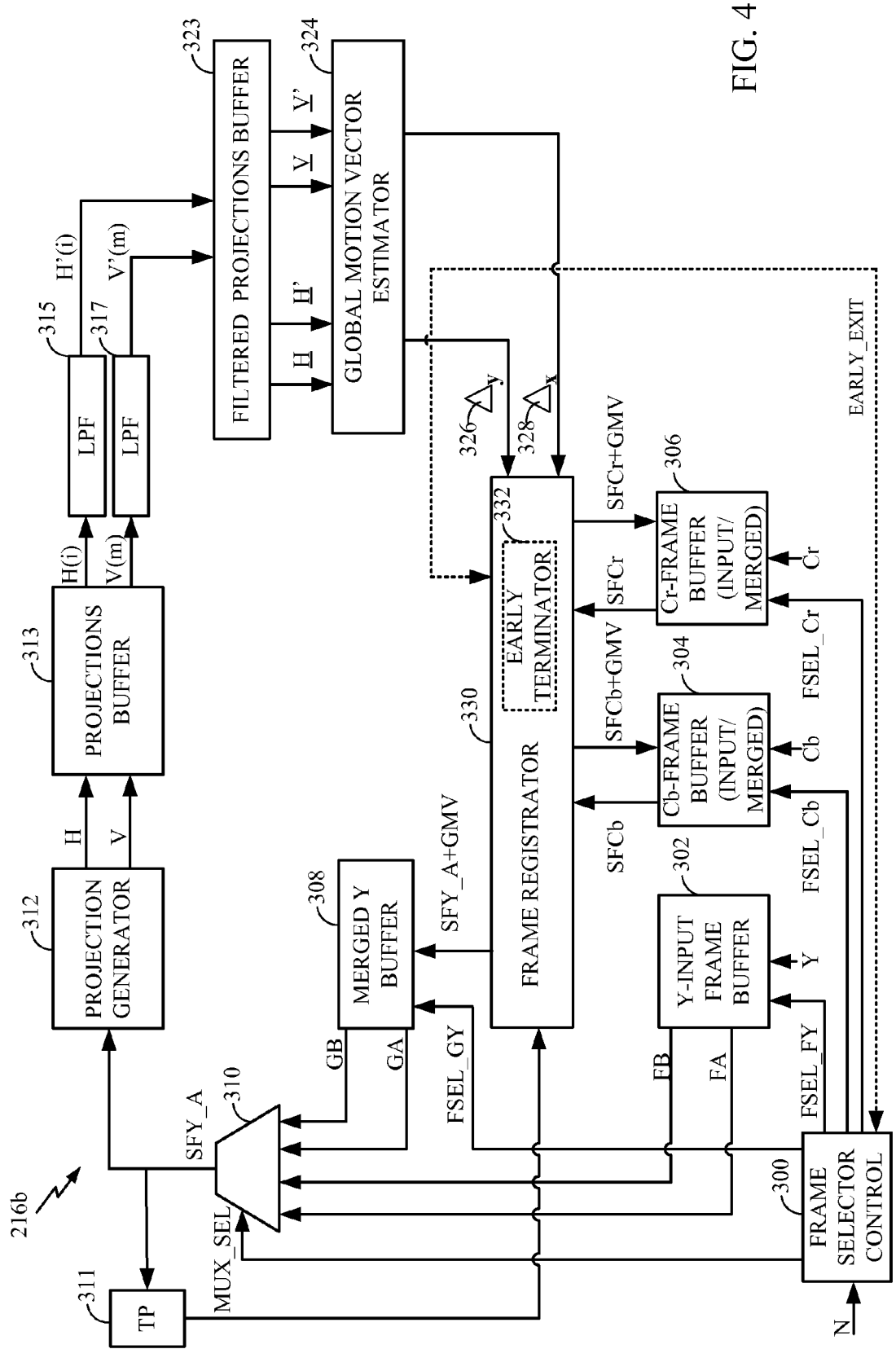
FIG. 4 is a hardware block diagram of another architectural configuration illustrating a frame registration module for estimating a global motion vector.

FIG. 4 is a hardware block diagram of another architectural configuration illustrating a frame registration module 216*b* for estimating global motion. The architectural configuration illustrated in FIG. 4 aims to reduce the number of components used to generate projections in a frame. As such, there is only one projections generator 312, and one low pass filter for filtering horizontal projections 315, and one low pass filter 317 for filtering vertical projections. Only one low pass filter may be required, if the projections, horizontal or vertical, are passed through the low pass filter serially, instead of in parallel as shown. It should also be noted that the horizontal and vertical set of projections need not be low pass filtered. The low pass filtering on any projection is optional.

Although frames may be processed simultaneously, through interleaving of rows between a base frame and a movement frame, FIG. 4 illustrates the generation of horizontal and vertical set of projections in either a base frame or a movement frame. In the architectural configuration illustrated in FIG. 4, an sfY_a frame is either a base frame or a movement frame, that is, sfY_a is of the following form: [base frame, movement frame, base frame, movement frame, . . . base frame, movement frame]. When sfY_a is a base frame, toggle pass (TP) 311, in the upper left corner of FIG. 3, allows sfY_a to pass into frame registrator 330.

As in FIG. 3, interpolation of rows in a frame or interpolation of columns in a frame may be implemented. Also as shown in FIG. 3, horizontal and vertical projections for a base frame and a movement frame are generated. As illustrated, the set of projections, $\overline{H}$, $\overline{V}$, $\overline{H'}$ and $\overline{V'}$ may be queued and stored in filtered projections buffer 323. The four sets may then be sent to global motion vector estimator 324.

The inputs ($\overline{H}$, $\overline{V}$, $\overline{H'}$ and $\overline{V'}$) and the output (global motion vector 329) to motion vector estimator 328, as well as the components and calculations that follow the estimate of global motion vector estimate 329, are as disclosed in FIG. 3. In both FIG. 3 and FIG. 4, what is disclosed illustrates that for any base frame and movement frame pair, on at least one image-component (e.g. Y), an iteration of frame registration takes place. For every iteration, a global motion vector estimate 329 may be generated.

Selection of which frame is a base frame and which frame is a movement frame may be designated by frame flow-trees such as those illustrated in FIG. 5A-5F, and which may be implemented in a block such as frame selector control 300. Frame flow-trees may be implemented by using a configurable look-up-table (LUT) designating what frames to register in each row of a frame flow-tree, depending on the parity of the number of frames in the row. The frame flow-tree 332*a* illustrated in FIG. 5A has four rows. Row 1 shows six initial unregistered frames: f1 (base), f2 (movement), f3 (base), f4 (movement), f5 (base) and f6 (movement). Each of the six unregistered frames may represent an image-component, for example, the Y image-component. Frame registration of frame f2 to f1 generates registered frame g1*a* in row 2, frame registration of frame f4 to f3 generates registered frame g2*a* in row 2, and frame registration of frame f6 to f5 generates registered frame g3*a* in row 2. When there is an even number of frames in a row, the number of frame registrations yielding the subsequent row may be the even number divided by two. When there are three number of frames in a row, the mid-frame in the row, may be a base frame or a movement frame. For example, to generate frame g1*b* in row 3, g2*a* is used as a movement frame, and to generate frame g2*b* in row 3, g2*a* is used as a base frame. Row 4 contains registered frame g1*c* generated by registering frame g3*a* to registered frame g1*b*. As can be seen, frame registration may be on a previously registered frame or an unregistered frame.

Figure 5A:
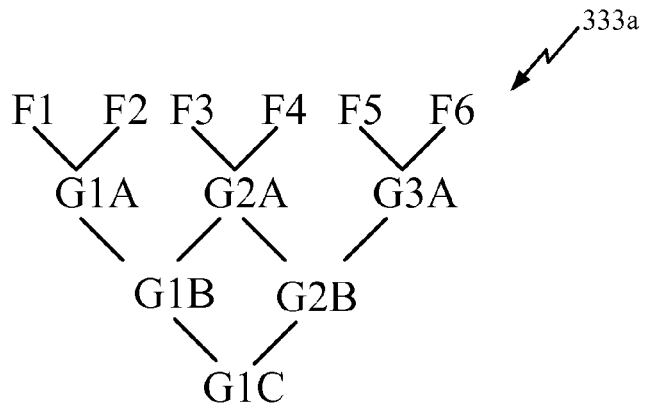
FIG. 5A-5F illustrate frame flow-trees, which may be used in the selection of which frame is a base frame and which frame is a movement frame.
Figure 5B:
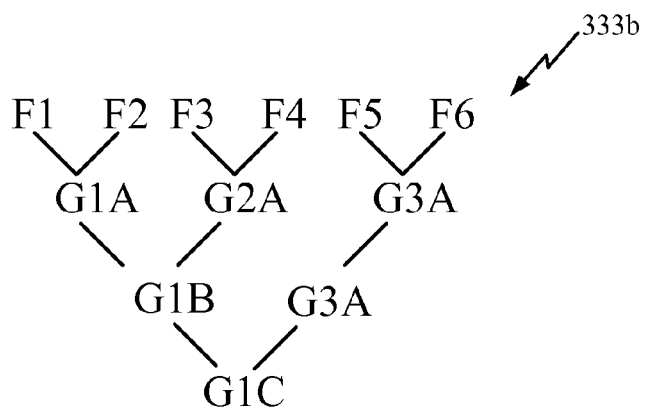
Figure 5C:
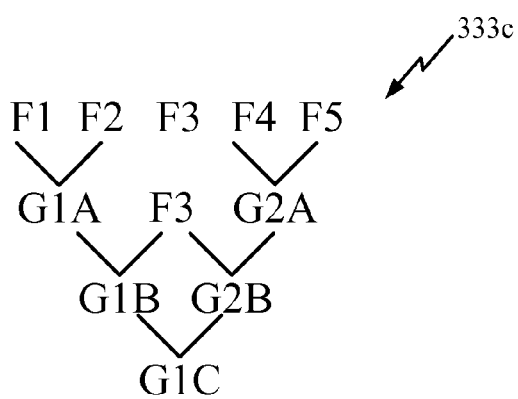

Frame flow-tree 332*b* illustrated in FIG. 5B also shows six initial unregistered frames in row 1. However, registered frame g2*a* is used only as a movement frame. The process of using the mid-frame (g2*a*), in a three frame row, as only a movement frame eliminates one frame registration iteration, although, it may not necessarily yield as accurate results. Frame flow-tree 332*c* illustrated in FIG. 5C shows an initial five unregistered frames in row 1. When the number of frames are odd and greater than three, the mid-frame may initially not be used in the frame registration to save on the number of frame registration iterations. That is, frame pairs f1 and f2, as well as frame pairs f4 and f5, are used to generate registered frames g1*a* and g2*a*. Frame registration from row 2 through row 4 is as described in frame flow-tree 332*a*.

Figure 5D:
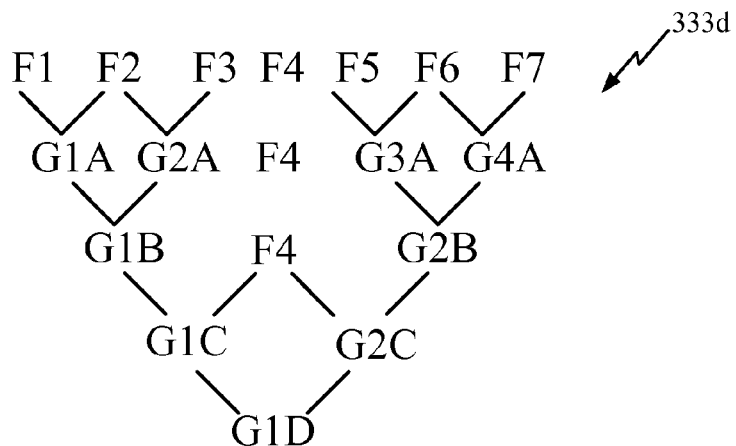

Frame flow-tree 332*d* illustrated in FIG. 5D shows seven initial unregistered frames in row 1. Since the number of frames are odd and greater than three, the mid-frame may initially not be used in the frame registration to save on the number of frame registration iterations. In addition, because there are a set of a triplet of frames on each side of the mid-frame (f4) in row 1, the triplets may be processed as discussed rows 2-4 of frame flow-tree 332a. This yields, in row 2 of frame flow-tree 332d, a frame flow-tree like frame flow-tree 332c, and may be processed accordingly.

Figure 5E:
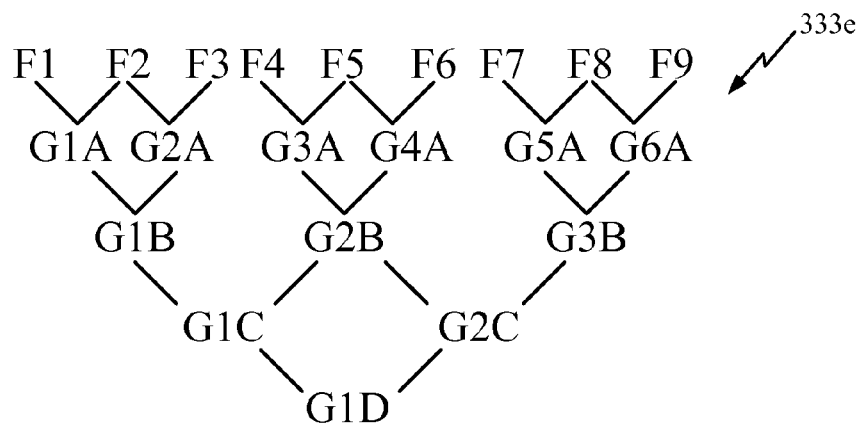
Figure 5F:
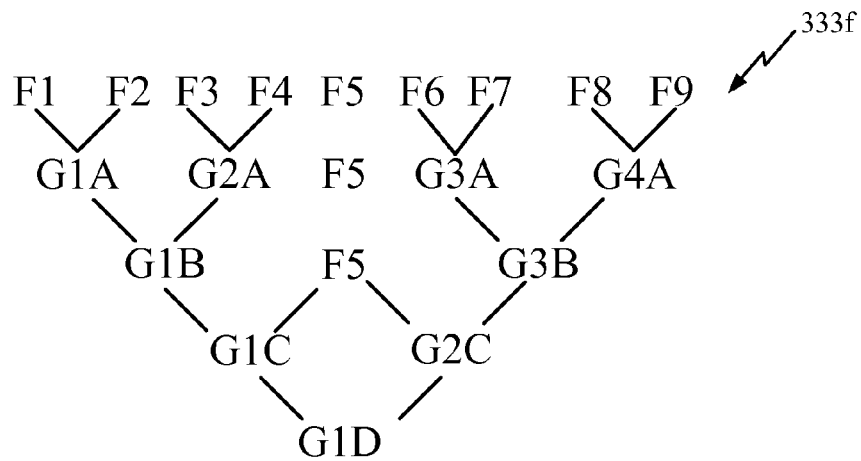

Frame flow-trees 332e and 332f illustrated in FIG. 5E and FIG. 5F, respectively, show nine initial unregistered frames in row 1. There are three sets of triplets of frames in row 1 of frame flow-tree 332e. The triplets may be processed as discussed for rows 2-4 of frame flow-tree 332a. Since the number of frames are odd and greater than three, the mid-frame (f5) in row 1 of frame flow-tree 332f, may initially not be used in the frame registration. Although using the process illustrated in frame-flow tree 332f saves on the number of frame registration iterations, it may not necessarily yield any less desirable than the process illustrated in frame flow-tree 332e.

As the number of frames increases, the exposure times between frames decreases and the probability that there is a smaller linear displacement increases. That is, the estimated linear displacement between frames when the exposure time is smaller is likely to be smaller, thus, accuracy in the estimate used for compensating for the linear displacement better. Hence, the process illustrated in frame flow-tree 332f may be implemented in a device that takes digital pictures using hand jitter reduction, since the process is likely to be sufficient most of the time to the human eye. Other applications that may require higher resolutions and are not as concerned with computation time, may wish to implement a process where there are a higher number of total frame registrations, such as in frame flow-tree 332e.

Figure 6:
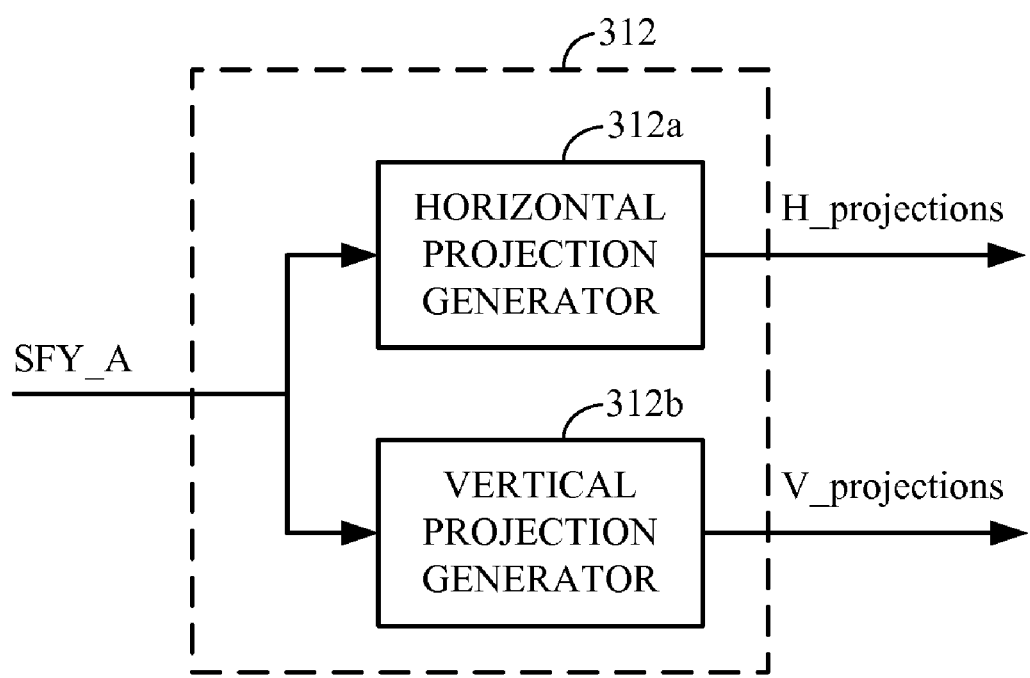
FIG. 6 illustrates a projection generator.

FIG. 6 illustrates a possible configuration of a projection generator 312, which may comprise a horizontal projection generator 312a and a vertical projection generator 312b. It should be noted that another configuration of a projection generator, such as projection generator 312 shown, may not have separate horizontal and vertical projection generators and use only one projection generator that generates projections. A projection generator may be used independently of horizontal or vertical orientation. Hence, calling a projection generator a horizontal or a vertical projection generator, is merely used to identify what type of elements (e.g., pixels) are being summed to generate a projection.

Figure 7:
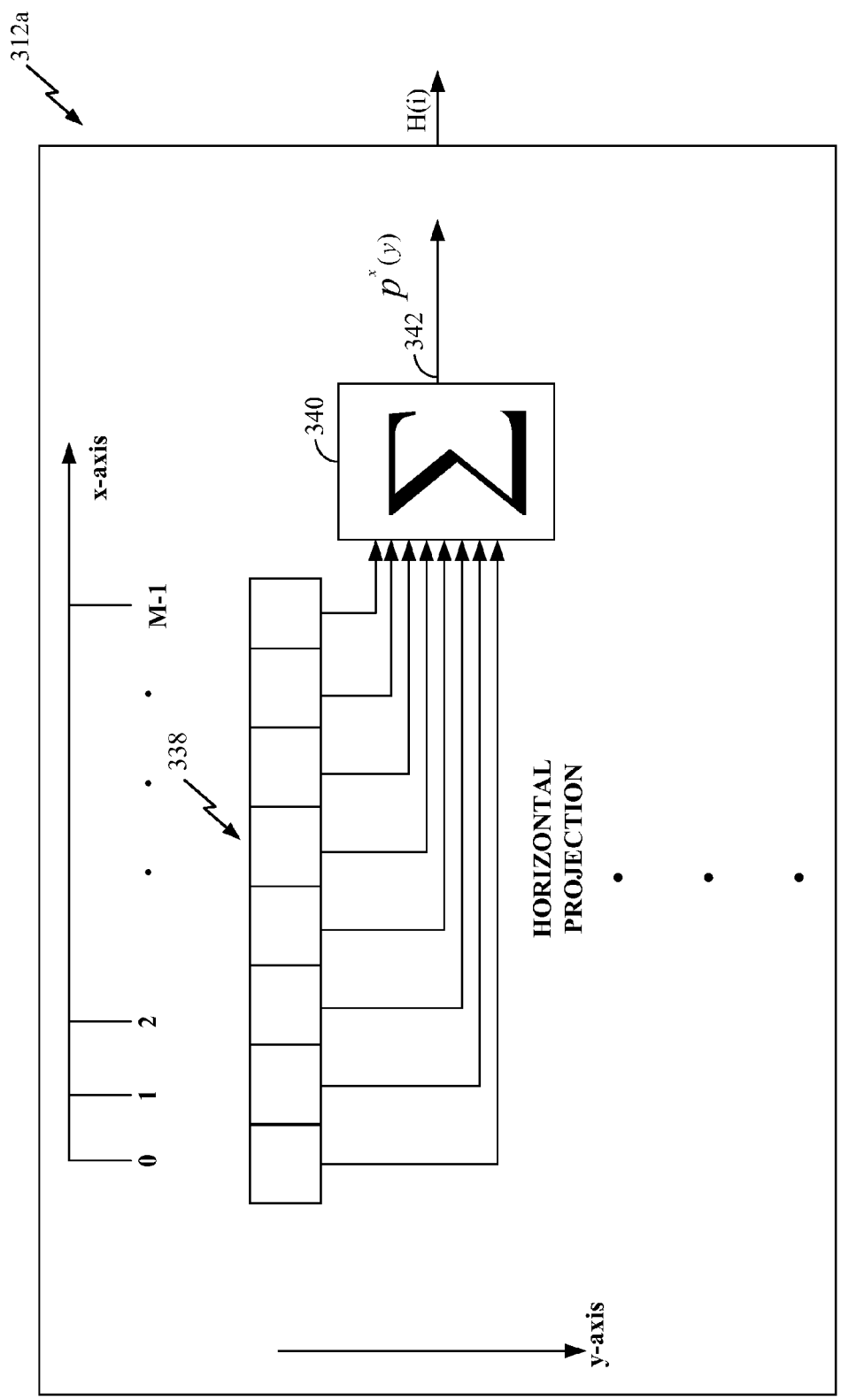
FIG. 7 illustrates a projection generator that may generate horizontal projections.
Figure 8:
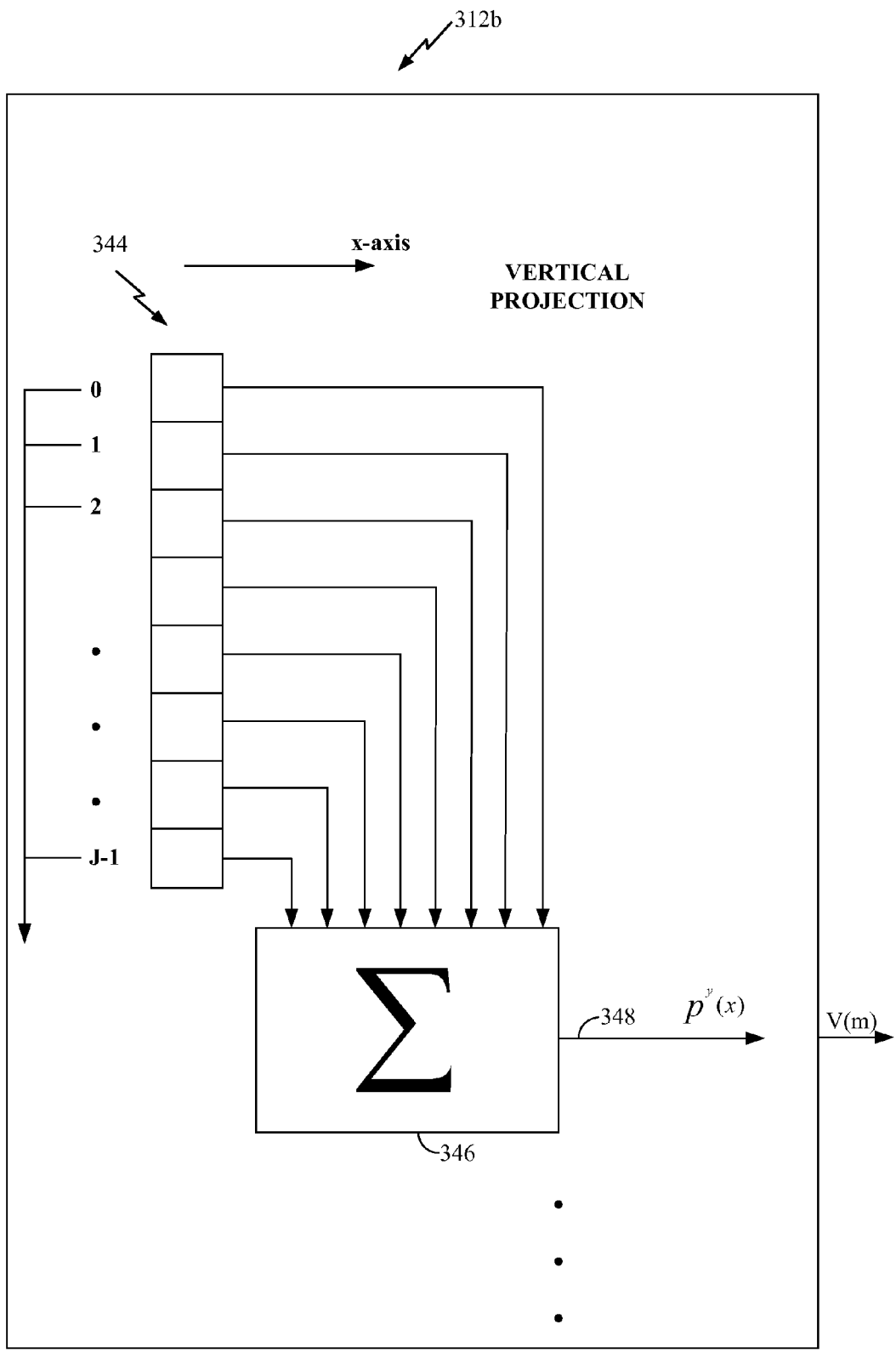
FIG. 8 illustrates a projection generator that may generate vertical projections.

Projections may be on columns or rows. FIG. 7 illustrates a row of pixels 338 being summed by a summer 340 to generate a horizontal projection 342. FIG. 8 illustrates a column of pixels 344 being summed by a summer 346 to generate a vertical projection 348. FIG. 9 illustrates a frame 350, where the dark lines, with an arrow tip, represent the generation of projections. The set of horizontal projections $\{P1_y, P2_y, \ldots, Pl_y\}$ is illustrated on the right side of the frame 350. Although, I horizontal projections are illustrated, there may be more (through interpolation) or less (through decimation) projections. The set of vertical projections $\{P1_x, P2_x, \ldots, PM_x\}$ is illustrated on the right side of the frame 350. Although, M vertical projections are illustrated, there may be more (through interpolation) or less (through decimation) projections.

FIG. 10 illustrates a possible transfer function of a low pass filter. The cut-off frequency, fc, should be large enough to allow for adequate resolution of the element being operated on, i.e., pixel, sub-pixel, etc. Illustrated in FIG. 11, is a possible configuration of a global motion vector estimator 324, with four inputs, vector $\overline{H}$ 360x, vector $\overline{V}$ 370y, vector $\overline{H}'$ 360x', and vector $\overline{V}'$ 370y'. Projection correlator 380, may compute the difference between the two input vectors ($\overline{H}$ 360x and $\overline{H}'$ 360x') and generates a projection correlation error (pce) vector at each shift position between the two input vectors. Computing the difference of the input vectors for the set of shift positions between the input vectors generates a set of pce vectors. Computing the norm of each pce vector at each shift generates a pce value. Each pce value may be stored in memory 386. Minimum pce value index selector 388 selects the minimum pce value amongst the set of pce values stored in memory 386. The index selector outputs the shift position that corresponds to the minimum pce value, i.e., the index of the minimum pce value is the shift position, and is called the x-component of the global motion vector, $\Delta_x$ 326.

Similarly, projection correlator 390, may compute the difference between the two input vectors ($\overline{V}$ 370y and $\overline{V}'$ 370y') and generates a projection correlation error (pce) vector at each shift position between the two input vectors. As discussed above, computing the difference of the input vectors for the set of shift positions between the input vectors generates a set of pce vectors. Computing the norm of each pce vector at each shift generates a pce value. Each pce value may be stored in memory 396. Minimum pce value index selector 398 selects the minimum pce value amongst the set of pce values stored in memory 396. The index selector outputs the shift position that corresponds to the minimum pce value, i.e., the index of the minimum pce value is the shift position, and is called the y-component of the global motion vector, $\Delta_y$ 328.

FIG. 12a illustrates more details of the global motion vector estimator 324. Input vectors, $\overline{H}$ 360x and $\overline{H}'$ 360x', are input into projection correlator 380. Either input vector may be connected to a shifter 381 which shifts by $\Delta_y$ positions. The shifter 381 is used for shift aligning the vector $\overline{H}$ 360x with the different vector $\overline{H}'$ 360x'. Subtractor 382 computes the difference between the two input vectors and generates a projection correlation error (pce) vector at each shift position between the two input vectors. Computing the norm of each pce vector at each shift position generates a pce value. To compute the norm, abs block 383 computes the absolute value of the pce vector, and summer 384 sums all the elements of the pce vector. Thus, each pce value is a norm of a pce vector. Illustrated in FIG. 12a is an L1 norm. However, another norm, such as an L2 norm or a variant of the L2 norm may be used. Each pce value may be stored in memory 386. Minimum pce value index selector 388 selects the minimum pce value amongst the set of pce values stored in memory 386. Memory elements 386a, 386b, and 386c represent pce values in the set of pce values that may be stored from the output of projection correlator 380. As noted above, the index of the minimum pce value selected 388 is called the x-component of the global motion vector, $\Delta_x$ 326.

Analogously, FIG. 12b illustrates more details of the global motion vector estimator 324. Input vectors, $\overline{V}$ 370y and $\overline{V}'$ 370y', are input into projection correlator 380. Either input vector may be connected to a shifter 391 which shifts by $\Delta_x$ positions. The shifter 391 is used for shift aligning the vector $\overline{V}$ 370y with the different vector $\overline{V}'$ 370y. Subtractor 392 computes the difference between the two input vectors and generates a projection correlation error (pce) vector at each shift position between the two input vectors. Computing the norm of each pce vector at each shift position generates a pce value. To compute the norm, abs block 393 computes the absolute value of the pce vector, and summer 394 sums all the elements of the pce vector. Thus, each pce value is a norm of a pce vector. Illustrated in FIG. 12b is an L1 norm. However, another norm, such as an L2 norm or a variant of the L2 norm may be used. Each pce value may be stored in memory 396. Minimum pce value index selector 398 selects the minimum pce value amongst the set of pce values stored in memory 396. Memory elements 396a, 396b, and 396c represent pce values in the set of pce values that may be stored from the output of projection correlator 390. As noted above, the index of the minimum pce value selected 398 is called the y-component of the global motion vector, $\Delta_y$ 328.

Mathematically, the set (for all values of $\Delta_y$) of pce values to estimate a vertical movement between frames is captured by equation 1 below:

$$pce(\Delta_y) = \sum_{m=0}^{M-\Delta_y-1} |\underline{H}(m) - \underline{H}'(m+\Delta_y)| \quad \text{(equation 1)}$$

Equation 1 above, may generate a vertical estimate that is between 0 and M-1 elements (e.g., pixels, sub-pixels). Equation 2 below, may also be used to capture the set of pce values. However, this may generate a vertical estimate that is between −M/2 and M/2−1 elements (e.g., pixels, sub-pixels).

$$pce(\Delta_y) = \sum_{m=-\frac{M}{2}}^{\frac{M}{2}-\Delta_y-1} |\underline{H}(m) - \underline{H}'(m+\Delta_y)| \quad \text{(equation 2)}$$

Similarly, equations 3 and 4, may be used to estimate a horizontal movement between frames.

$$pce(\Delta_x) = \sum_{i=0}^{T-\Delta_x-1} |\underline{V}(i) - \underline{V}'(i+\Delta_x)| \quad \text{(equation 3)}$$

Equation 3 above, may generate a vertical estimate that is between 0 and I-1 elements (e.g., pixels, sub-pixels). Equation 4 below, may also be used to capture the set of pce values. However, this may generate a vertical estimate that is between −I/2 and I/2−1 elements (e.g., pixels, sub-pixels).

$$pce(\Delta_x) = \sum_{i=-\frac{I}{2}}^{\frac{I}{2}-\Delta_x-1} |\underline{V}(i) - \underline{V}'(i+\Delta_x)| \quad \text{(equation 4)}$$

Subsequent to all N frames being processed on one image-component (e.g., Y), it may be possible to add all the estimated rotation angles to the appropriate frames on the other image-components (e.g., Cb and Cr). This may happen because projections need only be generated for one image-component and the frame registration sequence is known beforehand via a frame flow-tree. This possible architecture configuration of frame registrator 330 is not shown. One configuration of frame registrator 330, which is shown in FIG. 13, may have up to three adders, for adding global motion vector 329 to any of the image-components. Global motion vector (gmv) 329 may be routed to a first adder 390 and added to a base frame sfY_a to generate a registered frame sfY_a+gmv. Global motion vector 329 may be routed to a second adder 392 and added to a base frame sfCb to generate a registered frame sfCb+gmv. Global motion vector 329 may be routed to a third adder 394 and added to a base frame sfCr to generate a registered frame sfCr+gmv.

FIG. 14 illustrates a possible configuration of early terminator 332. A vertical movement threshold 406, $y_{th}$, may be compared with a comparator 410 to y-component global motion vector, $\Delta_y$ 326. Comparator 410 may take the difference, $\Delta_y-y_{th}$ and the sign-bit may be checked by sign-bit detector 414. When $y_{th}$ is greater than $\Delta_y$ 326, the difference is negative and the sign bit of the difference may be set. A horizontal movement threshold 408, $x_{th}$, may be compared with a comparator 412 to x-component global motion vector, $\Delta_x$. Comparator 416 may take the difference, $\Delta_x-x_{th}$ and the sign-bit may be checked by sign-bit detector 414. When $x_{th}$ is greater than $\Delta_x$, the difference is negative and the sign bit of the difference may be set.

The setting of both sign-bits may trigger an early exit signal and if desired, stop the processing of the N unregistered frames.

FIG. 15 is a flow chart illustrating a possible method of frame registration of images. N frames are input 440 and control of frame selection 442 may be implemented as illustrated in the frame flow-trees disclosed in FIG. 5A-5F. Storing and fetching of image-component Y 444, storing and fetching of image component Cb 446, and storing and fetching of image-component Cr 448 may take place. Signals fsel_Y, fsel_Cb, and fsel_Cr may select which frames are processed in accordance with a frame flow-tree such as disclosed in FIG. 5A-5F. A base frame and movement frame for at least one-image component may be selected. Horizontal and vertical projections may be generated 452 as disclosed above. Potentially, low pass filtering 454 may take place as disclosed previously. Four vectors may be formed (as disclosed above) and used for projection correlation 458. The projection correlation 458 may generate two sets of pce values. The x-component shift position (i.e., index) resulting from the selection of a minimum pce value 460, amongst the set of pce values, may be used to estimate the horizontal movement between a base frame and a movement frame. The index of the minimum pce value is called the x-component of the global motion vector, $\Delta_x$ 328. Analogously, the y-component shift position (i.e., index) resulting from the selection of a minimum pce value 462, amongst the set of pce values, may be used to estimate the vertical movement between a base frame and a movement frame. The index of the minimum pce value is called the y-component of the global motion vector, $\Delta_x$ 326. As discussed above, the global motion vector 329 may be generated from frame registration 464. There may be an early exit signal (although not explicitly illustrated) to terminate the method prior to N frames being processed.

A graph 472 for a set of horizontal projections for a base frame (labeled $1^{st}$ image) and a movement frame (labeled $2^{nd}$ image) is illustrated in FIG. 16. The difference between the solid (base frame) and dashed (movement) curve is an estimate of the x-component of the global motion vector, $\Delta_x$ 328.

A graph 474 for a set of vertical projections for a base frame (labeled $1^{st}$ image) and a movement frame (labeled $2^{nd}$ image) is illustrated in FIG. 17. The difference between the solid (base frame) and dashed (movement) curve is an estimate of the y-component of the global motion vector, $\Delta_y$ 326.

A number of different configurations and techniques have been described. The techniques may improve removing blurriness from images with longer exposure times. The techniques and configurations may also aid in the reduction of hand jitter for practically any digital device that takes pictures. The techniques and configurations may be implemented in hardware, software, firmware, or any combination thereof If implemented in software, the techniques and configurations may be directed to a computer-readable medium comprising computer-readable program code (also may be called computer-code), that when executed in a device that takes pictures, performs one or more of the methods mentioned above.

The computer-readable program code may be stored on memory in the form of computer readable instructions. In that case, a processor such as a DSP may execute instructions stored in memory in order to carry out one or more of the techniques described herein. In some cases, the techniques may be executed by a DSP that invokes various hardware components, such as projection correlation, to accelerate the frame registration process. The frame registration techniques and configurations disclosed may be implemented in one or more microprocessors, one or more application specific integrated circuits (ASICs), and one or more field programmable gate arrays (FPGAs), or some other hardware software combination. These techniques and configurations are within the scope of the following claims.

The invention claimed is:

1. A method of frame registration of images comprising:
generating a first plurality of projections from a first frame;
generating a second plurality of projections from a second frame;
comparing a first set of projections amongst the first plurality of projections with a second set of projections amongst the second plurality of projections, and generate a set of projection correlation error (pce) values;
selecting the first frame and second frame based on a parity of a number of total frames to be processed in a row from a frame flow-tree, wherein the frame flow-tree includes a tree of frames where leaf nodes include unregistered frames and other nodes include registered frames that are based on their respective child nodes;
generating a component of a global motion vector estimate by selecting a minimum pce value from among the set of pce values; and
adding the estimated global motion vector to the first frame.

2. The method of claim 1, wherein the comparing further comprises taking the first set of projections and shift aligning them with the second set of projections, where shift aligning includes shifting the position between two input vectors for each position between the two vectors.

3. The method of claim 2, wherein the first set of projections is a first vector and the second set of projections is a second vector.

4. The method of claim 3, wherein the comparing further comprises performing a subtraction operation between the first vector and the second vector to generate a pce vector.

5. The method of claim 4, wherein a norm of the pce vector is taken to generate a pce value.

6. The method of claim 5, wherein the norm is an L1 norm.

7. The method of claim 1, wherein the generating the global motion vector estimate comprises selecting a first minimum pce value from amongst a first set of pce values to determine a first minimum shift value, and selecting a second minimum pce value from amongst a second set of pce values to determine a second minimum shift value.

8. The method of claim 7, wherein the registration stops when the first minimum shift value is smaller than a first shift threshold and the second minimum shift value is smaller than a second shift threshold.

9. The method of claim 1, wherein at least one set of projections from the first frame and at least one set of projections from the second frame are low pass filtered.

10. The method of claim 1, wherein at least one set of projections from the first frame and at least one set of projections from the second frame are interpolated.

11. The method of claim 1, wherein the first frame and the second frame comprises pixels.

12. The method of claim 1, wherein the first frame and the second frame comprises spatial-frequency transformed pixels.

13. A non-transitory computer-readable medium embodying a set of instructions, wherein the set of instructions when executed by one or more processors comprises:
computer-readable program code means for generating a first plurality of projections from a first frame;
computer-readable program code means for generating a second plurality of projections from a second frame;
computer-readable program code means for comparing a first set of projections amongst the first plurality of projections with a second set of projections amongst the second plurality of projections, and generate a set of projection correlation error (pce) values;
computer-readable program code means for selecting the first frame and second frame based on a parity of a number of total frames to be processed in a row from a frame flow-tree, wherein the frame flow-tree includes a tree of frames where leaf nodes include unregistered frames and other nodes include registered frames that are based on their respective child nodes;
computer-readable program code means for generating a component of a global motion vector estimate by selecting a minimum pce value from among the set of pce values; and
computer-readable program code means for registration of a frame based on adding the estimated global motion vector to the first frame.

14. The computer-readable medium of claim 13, wherein the computer-readable program code means for comparing further comprises taking the first set of projections and shift aligning them with the second set of projections, where shift aligning includes shifting the position between two input vectors for each position between the two vectors.

15. The computer-readable medium of claim 14, wherein the first set of projections is a first vector and the second set of projections is a second vector.

16. The computer-readable medium of claim 15, wherein the first vector and the second vector are subtracted from each other to generate a pce vector.

17. The computer-readable medium of claim 16, wherein a norm of the pce vector is taken to generate a pce value.

18. The computer-readable medium of claim 17, wherein the norm is an L1 norm.

19. The computer-readable medium of claim 13, wherein the computer-readable program code means for generating the global motion vector estimate comprises selecting a first minimum pce value from amongst a first set of pce values to determine a first minimum shift value, and selecting a second minimum pce value from amongst a second set of pce values to determine a second minimum shift value.

20. The computer-readable medium of claim 19, wherein registration stops when the first minimum shift value is smaller than a first shift threshold and the second minimum shift value is smaller than a second shift threshold.

21. The computer-readable medium of claim 13, wherein at least one set of projections from the first frame and at least one set of projections from the second frame are low pass filtered.

22. The computer-readable medium of claim 13, wherein at least on set of projections from the first frame and at least one set of projections from the second frame are decimated.

23. The method computer-readable medium of claim 13, wherein the first frame and the second frame comprises pixels.

24. The computer-readable medium of claim 13, wherein the first frame and the second frame comprises spatial-frequency transformed pixels.

25. An apparatus comprising:
- means for generating a first plurality of projections from a first frame;
- means for generating a second plurality of projections from a second frame;
- means for comparing a first set of projections amongst the first plurality of projections with a second set of projections amongst the second plurality of projections, and generate a set of projection correlation error (pce) values;
- means for selecting the first frame and second frame based on a parity of a number of total frames to be processed in a row from a frame flow-tree, wherein the frame flow-tree includes a tree of frames where leaf nodes include unregistered frames and other nodes include registered frames that are based on their respective child nodes;
- means for generating a component of a global motion vector estimate by selecting a minimum pce value from among the set of pce values; and
- means for registration of a frame based on adding the global motion vector estimate to an image-component.

26. The apparatus of claim 25, wherein the means for comparing further comprises taking the first set of projections and shift aligning them with the second set of projections, where shift aligning includes shifting the position between two input vectors for each position between the two vectors.

27. The apparatus of claim 26, wherein the first set of projections is a first vector and the second set of projections is a second vector.

28. The apparatus of claim 27, wherein the first vector and the second vector are subtracted from each other to generate a pce vector.

29. The apparatus of claim 28, wherein a norm of the pce vector is taken to generate a pce value.

30. The apparatus of claim 29, wherein the norm is an L1 norm.

31. The apparatus of claim 25, wherein the means for generating the global motion vector estimate comprises selecting a first minimum pce value from amongst a first set of pce values to determine a first minimum shift value, and selecting a second minimum pce value from amongst a second set of pce values to determine a second minimum shift value.

32. The apparatus of claim 31, wherein the means for registration stops when the first minimum shift value is smaller than a first shift threshold and the second minimum shift value is smaller than a second shift threshold.

33. The apparatus of claim 25, wherein at least one set of projections from the first frame and at least one set of projections from the second frame are low pass filtered.

34. The apparatus of claim 25, wherein at least one set of projections from the first frame and at least one set of projections from the second frame are interpolated.

35. The apparatus of claim 25, wherein at least one set of projections from the first frame and at least one set of projections from the second frame are decimated.

36. The apparatus of claim 25, wherein the first frame and the second frame comprises pixels.

37. The apparatus of claim 25, wherein the first frame and the second frame comprises spatial-frequency transformed pixels.

* * * * *